United States Patent
Song et al.

(10) Patent No.: US 10,830,934 B2
(45) Date of Patent: Nov. 10, 2020

(54) OPTICAL ELEMENT

(71) Applicant: Research & Business Foundation SUNGKYUNKWAN UNIVERSITY, Gyeonggi-do (KR)

(72) Inventors: Jang Kun Song, Seoul (KR); Tianzi Shen, Suwon-si (KR)

(73) Assignee: RESEARCH & BUSINESS FOUNDATION SUNGKYUNKWAN UNIVERSITY, Gyeonggi-Do (KR)

( * ) Notice: Subject to any disclaimer, the term of this patent is extended or adjusted under 35 U.S.C. 154(b) by 246 days.

(21) Appl. No.: 16/018,797

(22) Filed: Jun. 26, 2018

(65) Prior Publication Data

US 2019/0004226 A1 Jan. 3, 2019

(30) Foreign Application Priority Data

Jun. 28, 2017 (KR) .................. 10-2017-0081706
Mar. 15, 2018 (KR) .................. 10-2018-0030478

(51) Int. Cl.
G02B 5/30 (2006.01)
G02F 1/1335 (2006.01)
(Continued)

(52) U.S. Cl.
CPC ........... G02B 5/3025 (2013.01); G02F 1/137 (2013.01); G02F 1/1343 (2013.01);
(Continued)

(58) Field of Classification Search
CPC .... B82Y 30/00; C08K 2201/011; C09D 7/70; G02F 1/133528; G02B 5/3025; G02B 5/3058
See application file for complete search history.

(56) References Cited

U.S. PATENT DOCUMENTS 7,108,935 B2 * 9/2006 Bauer ................ H01M 8/1039
429/535
2006/0006363 A1 * 1/2006 Heckmeier ............ C09K 19/46
252/299.01
(Continued)

FOREIGN PATENT DOCUMENTS

JP 2016508176 A 3/2016
KR 101022689 B1 3/2011

OTHER PUBLICATIONS

D. Sun, "Colloidal Manipulation of Nanostructures: Stable Dispersion and Self-Assembly", May 2009 Year: (2009).*
(Continued)

*Primary Examiner* — Christopher Stanford
(74) *Attorney, Agent, or Firm* — Cantor Colburn LLP

(57) ABSTRACT

An exemplary embodiment of the present invention provides an optical element including a first polarizer and a second polarizer disposed to be perpendicular to each other, and a cell disposed between the first polarizer and the second polarizer. The cell includes a first substrate and a second substrate facing each other, an electrode positioned between the first substrate and the second substrate, and a dispersion disposed between the first substrate and the second substrate and including at least one of peeled α-ZrP particles and peeled α-TiP particles. The peeled α-ZrP particles and the peeled α-TiP particles are in a nematic state. The orientation of at least one of the α-ZrP particles or the α-TiP particles is changed by an electric field applied to the electrode.

22 Claims, 28 Drawing Sheets

(51) Int. Cl.
  *G02F 1/133* (2006.01)
  *G02F 1/1343* (2006.01)
  *G02F 1/137* (2006.01)
(52) U.S. Cl.
  CPC .... *G02F 1/13306* (2013.01); *G02F 1/133528* (2013.01); *G02F 2201/121* (2013.01); *G02F 2201/123* (2013.01); *G02F 2202/30* (2013.01); *G02F 2202/34* (2013.01)

(56) References Cited

U.S. PATENT DOCUMENTS

| | | | | |
|---|---|---|---|---|
| 2009/0035469 | A1* | 2/2009 | Sue | B82Y 30/00 427/282 |
| 2010/0302481 | A1* | 12/2010 | Baum | B29D 11/00634 349/96 |
| 2012/0326180 | A1* | 12/2012 | Ohe | H01L 27/322 257/88 |
| 2014/0193590 | A1* | 7/2014 | Sue | C09D 163/00 427/512 |
| 2016/0115324 | A1* | 4/2016 | Li | C09D 5/084 428/418 |
| 2017/0173546 | A1 | 6/2017 | Cheng et al. | |
| 2018/0348577 | A1* | 12/2018 | Pousthomis | H01L 33/50 |

OTHER PUBLICATIONS

J. C. Mejia, "Electric Field Induced Birefringence in Isotropic Suspensions of Nanoplates", Dec. 2017 (Year: 2017).*
Y. Chang, et al., "Gelation via Ion Exchange in Discotic Suspensions", Jun. 2012 (Year: 2012).*
Miyamoto, et al. "Colloidal Nanosheets" Chapter 8, 2017 (Year: 2017).*
Chen, et al., "Observation of isotropic-isotropic demixing in colloidal platelet-sphere mixtures", 2015 (Year: 2015).*
Yu, et al., "Synthesis and Exfoliation of Discotic Zirconium Phosphates to Obtain Colloidal Liquid Crystals", 2016 (Year: 2016).*
Ahmad et al, "Effect of solvents on the electro-optical switching of graphene oxide dispersions", Applied Physics Letters, 108, 2016, pp. 251903-1-251903-4.
Ahmad et al, "Electric Field-Induced Ordering of Reduced Graphene Oxide Particles in Colloid", American Scientific Pulishers, Journal of Nanoscience and Nanotechnology, vol. 16, 2016, pp. 11364-11368.
Ahmad et al, "Guided electro-optical switching of small graphene oxide particles by larger ones in aqueous dispersion", Langmuir, 2016, pp. 1-19.
Ahmad et al., "Optimization of particle size for high birefringence and fast switching time in electro-optical switching of graphene oxide dispersions", Optic Express, vol. 23, No. 4, 2015, pp. 4435-4440.
Arenas-Guerrero et al, "Electric birefringence spectroscopy of montmorillonite particles", Soft Matter, 12, 2016, pp. 4923-4931.
Arsenault et al., "Photonic-crystal full-colour displays", Nature Photonics, vol. 1, 2007, pp. 468-472.
Dozov et al, "Electric-Field-Induced Perfect Anti-Nematic Order in Isotropic Aqueous Suspensions of a Natural Beidellite Clay", The Journal of Physical Chemistry B, 115, 2011, pp. 7751-7765.
Ekanayaka et al, "Effect of solvents on photonic crystallinity in graphene oxide dispersions", Carbon, 123, 2017, pp. 283-289.
Holzheu et al, "Mechanistic Origin of Transient Electric Birefringence Anomaly of Clay Mineral Dispersion", J. Phys. Chem. B, 106, 2002, pp. 4412-4418.
Hong et al, "Dielectrophoretic Condensation and Tailored Phase Separation in Graphene Oxide Liquid Crystals", Advanced Science News, Part. Part. Syst. Charact. 34, 2017, pp. 1600344 p. 1-6.
Hong et al, "Manipulation of structural color reflection in graphene oxide dispersions using electric fields", Optics Express, vol. 23, No. 15, 2015, pp. 18969-18974.
Jimenez et al, "Electric Birefringence of Dispersions of Platelets", Langmuir, 28, 2018, pp. 251-258.
Liu et al., "An anisotropic hydrogel with electrostatic repulsion between cofacially aligned nanosheets", Nature, vol. 517, 2015, pp. 68-72.
Mantegazza et al, "Anomalous field-induced particle orientation in dilute mixtures of charged rod-like and spherical colloids", Nature Physics, vol. 1, 2005, pp. 103-106.
Nanobrick, inspired by Mother Nature, http://www.nanobrick.co.kr/, Retrieved from Internet on Dec. 30, 2019 pp. 1-3.
Reinink et al., "Phase behaviour of lyotropic liquid crystals in external fields and confinement", Eur. Phys. J. Special Topics, 222, 2013, p. 3053-3069.
Sano et al., "Photonic water dynamically responsive to eternal stimuli", Nature Comm., vol. 7, 2016, p. 1-9.
Shen et al., "Bottom-up and top-down manipulations for multi-order photonic crystallinity in a graphene-oxide colloid", Nature, NPG Asia Materials, 8, 2016, pp.
Shen et al., "Deterioration and recovery of electro-optical performance of aqueous graphene-oxide liquid-crystal cells after prolonged storage", Carbon, 105, 2016. pp. 8-13.
Wong et al., "Solution Processable Iridescent Self-Assembled Nanoplatelets with Finely Tunable Interlayer Distances Using Charge- and Sterically Stabilizing Oligomeric Polyoxyalkyleneamine Surfactants", Chemistry of Materials,26, 2014, pp. 1528-1537.
Andres Fernando Mejia Mejia,"Discotic Colloids", a dissertation submitted to the Office of Graduate Studies of Texas A&M Univ., 2013, pp. 1-276.
Andres Fernando, et al., "Discotic Colloids", a Dissertation published by Texas A&M University, 2013, 276 pp.
Minhao Wong, et al., "Large-scale self-assembled zirconium phosphate smectic layers via a simple spray-coating process", Nature Communications, 2014, 12 pp.

* cited by examiner

Transmissive image

Reflective image

OPTICAL ELEMENT

TECHNICAL FIELD

The present invention relates to an optical element.

BACKGROUND ART

A liquid crystal display generally includes a cell including a thermotropic liquid crystal material consisting of organic molecules, electrodes for applying a voltage to a liquid crystal layer, and a driving circuit unit for sending signals to the electrodes. In this case, when the voltage is applied to pixels including a liquid crystal, polarization of light transmitted while the molecular orientation is deformed is controlled to control a light transmittance. In another LCD technology, external reflective light may be controlled using cholesteric liquid crystal molecules with an internal twist structure. Even in the case, the orientation state of the cholesteric liquid crystal is controlled by applying an electric field to change reflectivity.

Meanwhile, it has been proposed to fabricate a device which can be driven at a low voltage using an electric particle orientation effect in a colloid including graphene oxide particles, which is one type of lyotropic liquid crystals different from the thermotropic liquid crystal. Since the graphene oxide colloid has a high Kerr coefficient which means electro-optical reactivity and high electro-optical reactivity even though a low electric field is applied, the graphene oxide colloid can be applied as a low-power display device. However, the graphene oxide colloid has various problems, such as low chemical stability and low optical efficiency due to light absorption in visible light.

PRIOR ART

Patent Document (Patent Document 0001) Korean Patent Laid-Open Publication No. 2003-0034612 ("Method for Purifying Organic Compounds Used in Organic Electroluminescence Device", Sogang University Industry-Academic Cooperation Foundation)

DISCLOSURE

Technical Problem

The present invention has been made in an effort to control a light transmittance or a light reflectance at a low voltage. Further, the present invention has been made in an effort to achieve high chemical stability of a dispersion and solve a light absorption problem. Further, the present invention has been made in an effort to provide an optical element which can be fabricated in a thin type due to a high light transmittance and a low viscosity even at a high concentration.

Further, the present invention has been made in an effort to provide an optical element in which a light transmittance or a light reflectance is maintained for a predetermined time or more even when a voltage is removed according to an exemplary embodiment of the present invention.

However, the technical problems of the present invention are not limited thereto and will be variously extended without departing from the spirit and scope of the present invention.

Technical Solution

An exemplary embodiment of the present invention provides an optical element including a first polarizer and a second polarizer disposed to be perpendicular to each other, and a cell disposed between the first polarizer and the second polarizer. The cell includes a first substrate and a second substrate facing each other, electrodes positioned between the first substrate and the second substrate, and a dispersion disposed between the first substrate and the second substrate and including particles. The particles include at least one of peeled $\alpha$-ZrP particles or peeled $\alpha$-TiP particles. The particles are in a nematic state. The orientation of at least one of the $\alpha$-ZrP particles or the $\alpha$-TiP particles is changed by an electric field applied to the electrode.

The electrodes may include a pixel electrode and a common electrode, and the pixel electrode and the common electrode may be positioned on the same substrate.

The electrodes may include a pixel electrode and a common electrode, the pixel electrode may be positioned on the first substrate, and the common electrode may be positioned on the second substrate.

The particles may have a disk structures, and a monomer or a polymer or oligomer having a molecular weight of 500 or less may bind to the surface of the particles.

The particles may have a concentration of 0.5 wt % to 5 wt % with respect to the entire content of the dispersion.

The dispersion may include an organic solvent, and the organic solvent may include at least one of acetone, dimethylformamide (DMF), N-methylpyrrolidinone (NMP), methanol, ethanol, isopropyl alcohol, toluene, tetrahydrofuran (THF), and mixtures thereof.

The optical element may further include a light source unit.

When an electric field having a frequency of more than 1 kHz is applied to the dispersion including the particles by the electrode, the particles may be maintained in the nematic state and oriented in a parallel direction to the electric field, and when an electric field having a frequency of less than 10 Hz is applied to the dispersion including the particles by the electrode, the particles may be oriented in an isotropic state.

When an electric field having a frequency of 10 Hz to 1 kHz is applied to the dispersion including the particles by the electrode, the particles may be maintained in a nematic state and oriented in a vertical direction to the electric field, and when an electric field having a frequency of less than 10 Hz is applied to the dispersion by the electrode, the particles may be oriented in an isotropic state.

The direction of the electric field applied by the electrode may form an angle of 180° or 45° with a polarization direction of at least one of the first polarizer and the second polarizer to control the orientation direction of the particles.

The particles may have a concentration of 2 wt % to 5 wt % with respect to the entire content of the dispersion.

The orientation of the particles may be maintained after the electric field is removed.

Another exemplary embodiment of the present invention provides an optical element including a first polarizer and a second polarizer disposed to be perpendicular to each other; and a cell disposed between the first polarizer and the second polarizer. The cell includes a first substrate and a second substrate facing each other, electrodes positioned between the first substrate and the second substrate, and a dispersion disposed between the first substrate and the second substrate. The dispersion includes particles. The particles include at least one of $\alpha$-ZrP particles or $\alpha$-TiP particles including a plurality of layers and the particles are in an isotropic state. The orientation of the particles is changed by an electric field applied to the electrode.

The plurality of layers may be 10 to 50 layers.

The particles may have a concentration of 0.5 wt % to 15 wt % with respect to the entire content of the dispersion Yet another exemplary embodiment of the present invention provides an optical element including a first substrate and a second substrate facing each other; electrodes positioned between the first substrate and the second substrate; and a dispersion disposed between the first substrate and the second substrate and including particles. The particles include at least one of peeled α-ZrP particles or peeled α-TiP particles. The particles are in a lamellar state. The optical element selectively reflects light by the electric field applied to the electrode.

The electrodes may include a pixel electrode and a common electrode, and the pixel electrode and the common electrode may be positioned on the same substrate.

The electrodes may include a pixel electrode and a common electrode, the pixel electrode may be positioned on the first substrate, and the common electrode may be positioned on the second substrate.

The particles may have a disk structures, and a polymer or oligomer having a molecular weight of 500 or more may bind to the surface of the particles.

The particles may have a concentration of 0.3 wt % to 1.5 wt % with respect to the entire content of the dispersion.

As the concentration of the particles included in the dispersion is increased, the wavelength of reflected light may be decreased.

The dispersion may include an organic solvent, and the organic solvent may include at least one of acetone, dimethylformamide (DMF), N-methylpyrrolidinone (NMP), methanol, ethanol, isopropyl alcohol, toluene, tetrahydrofuran (THF), and mixtures thereof.

The orientation of the particles may alternate between a lamellar state in a parallel direction to the electric field and an isotropic state or alternate between the lamellar state in the parallel direction to the electric field and an anti-nematic state by modulating the frequency of the electric field applied by the electrode, and a light reflectance may be changed.

The orientation of the particles may alternate between a lamellar state in a vertical direction to the electric field and an isotropic state or alternate between the lamellar state in the vertical direction to the electric field and an anti-nematic state by modulating the frequency of the electric field applied by the electrode, and a light reflectance may be changed.

The orientation of the particles may be maintained after the electric field is removed.

Advantageous Effects

According to the exemplary embodiment of the present invention, it is possible to control a light transmittance or a light reflectance at a low voltage. Further, it is possible to achieve high chemical stability of a dispersion and solve a light absorption problem. Therefore, it is possible to provide a thin film type optical element having high light transmission efficiency and a low viscosity even at a high concentration.

Further, according to another exemplary embodiment of the present invention, it is possible to implement a low-power optical element by maintaining a light transmittance or a light reflectance for a predetermined time even when the voltage is removed.

MODE FOR INVENTION

Figure 1:
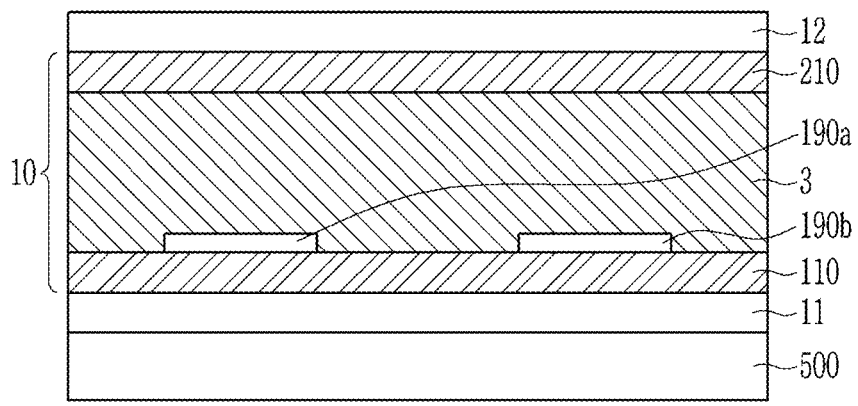
FIG. 1 illustrates a configuration of a transmissive optical element including a horizontal electric field according to an exemplary embodiment of the present invention.

The present invention may have various modifications and various exemplary embodiments and specific exemplary embodiments will be illustrated in the drawings and described in detail.

However, this does not limit the present invention to specific exemplary embodiments, and it should be understood that the present invention covers all the modifications, equivalents and replacements included within the idea and technical scope of the present invention.

Terms such as first, second, and the like may be used to describe various components and the components should not be limited by the terms. The terms are used only to discriminate one component from another component. For example, a first component may be named as a second component and similarly, the second component may be named as the first component without departing from the scope of the present invention. A term 'and/or' includes a combination of a plurality of associated disclosed items or any item of the plurality of associated disclosed items.

It should be understood that, when it is described that a component is "connected to" or "accesses" another component, the component may be directly connected to or access the other component or a third component may be present therebetween. In contrast, it should be understood that, when it is described that a component is "directly connected to" or "directly access" another component, it is understood that no element is present therebetween.

Terms used in the present application are used only to describe specific embodiments, and are not intended to limit the present invention. A singular form may include a plural form if there is no clearly opposite meaning in the context. In the present application, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

The terminology used herein is for the purpose of describing particular embodiments only and is not intended to be limiting. As used herein, the singular forms "a," "an," and "the" are intended to include the plural forms, including "at least one," unless the content clearly indicates otherwise.

Unless defined otherwise, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, preferred exemplary embodiments of the present invention will be described in more detail with reference to the accompanying drawings. In describing the present invention, like reference numerals refer to like elements in the drawings for easy overall understanding and a duplicated description of like elements will be omitted.

Transmissive Optical Element

FIG. 1 illustrates a configuration of a transmissive optical element including a horizontal electric field according to an exemplary embodiment of the present invention.

As illustrated in FIG. 1, a transmissive optical element according to an exemplary embodiment of the present invention includes a first polarizer 11 and a second polarizer 12 disposed to be perpendicular to each other and a cell 10 disposed between the first polarizer 11 and the second polarizer 12. The cell 10 includes a first substrate 110 and a second substrate 210 facing each other, electrodes 190a and 190b positioned between the first substrate 110 and the second substrate 210, and a dispersion 3 including at least one of peeled α-ZrP particles and peeled α-TiP particles. The arrangement or the number of electrodes 190a and 190b may be vary depending on an exemplary embodiment, and the electrodes 190a and 190b may include any shape capable of forming an electric field for controlling the orientation of the particles included in the dispersion 3. An insulation layer may be further included between the electrodes 190a and 190b and the dispersion 3.

The electrodes 190a and 190b may include a pixel electrode 190a and a common electrode 190b. The pixel electrode 190a and the common electrode 190b may be positioned on the same substrate. The electric field may include a plurality of directional components including a vertical component and a horizontal component to the substrate, and a light transmittance may be easily controlled by orienting the particles in parallel or vertically to the direction of the electric field.

Figure 2:
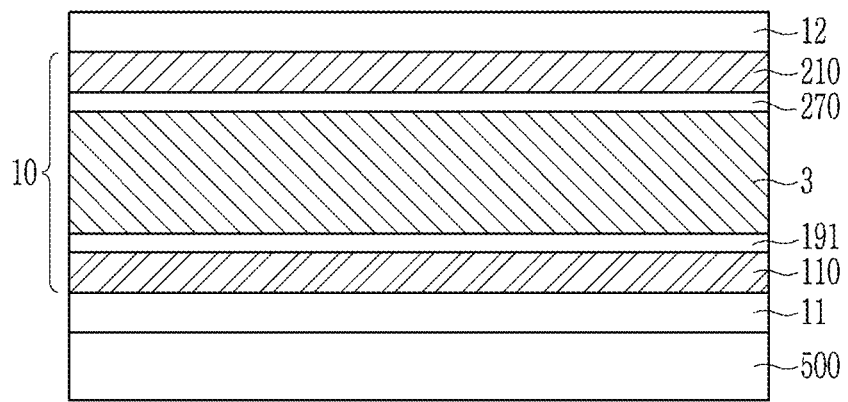
FIG. 2 illustrates a configuration of a transmissive optical element including a vertical electric field according to an exemplary embodiment of the present invention.

FIG. 2 illustrates a configuration of a transmissive optical element including a vertical electric field according to an exemplary embodiment of the present invention.

A transmissive optical element including a vertical electric field according to an exemplary embodiment includes a first polarizer 11 and a second polarizer 12, and a cell 10, and the cell 10 includes a first substrate 110, a second substrate 210, electrodes 191 and 270 positioned therebetween, and a dispersion 3. The remaining configurations except for the positions of the electrodes 191 and 270 are the same as those of FIG. 1, and thus, the description thereof will be omitted. The electrodes 191 and 270 may include a pixel electrode 191 and a common electrode 270. The pixel electrode 191 is positioned on the first substrate 110 and the common electrode 270 may be positioned on the second substrate 210. A separate insulation layer may be included between the pixel electrode 191 and the dispersion 3 and a separate insulation layer may also be included between the common electrode 270 and the dispersion 3. The electric field may include a plurality of directional components including a vertical component and a horizontal component to the substrate, and a light transmittance may be easily controlled by orienting the particles in parallel or vertically to the direction of the electric field.

The optical element according to the exemplary embodiment illustrated in FIGS. 1 and 2 includes the dispersion 3 positioned between the two substrates.

The dispersion 3 may include particles such as montmorillonite, bentonite, laponite, phosphates, metal oxide, and metal hydroxides, and for example, α-ZrP particles or α-TiP particles.

A method of synthesizing the α-ZrP particles will be briefly described. Zirconyl oxychloride octahydrate ($ZrOCl_2 8H_2O$) is mixed with phosphoric acid and subjected to hydrothermal treatment at 200° C. for 24 hours or more.

Thereafter, the mixture is washed with DI water and dried to synthesize the α-ZrP particles. A size of the particle may be controlled by a reaction time and mixing an additive and the like.

The dispersion 3 according to the exemplary embodiment may control a light transmittance by controlling the orientation or phase of at least one of the α-ZrP particles or the α-TiP particles. The dispersion 3 may be in a nematic state.

The α-ZrP particle and the α-TiP particle according to the exemplary embodiment may have a disk structure. The disk structure may refer to a particle having a single layer form and a thickness of about 1 nm.

A monomer or a polymer or oligomer having a molecular weight of 500 or less may bind to the surface of the α-ZrP particle and the α-TiP particle according to the exemplary embodiment. As an example of the monomer, tetrabutylammonium hydroxide (TBA hydroxide), tetrabutylammonium bromide (TBA Bromide), methylamine, propylamine, and the like may be used. As an example of the polymer or oligomer, jeffamine M1000 (polyoxyalkyleneamine), jeffamine M600, surfonamine L100, surfonamine B100, and the like may be used.

The α-ZrP particles or the α-TiP particles may have a concentration of 0.5 wt % to 5 wt % with respect to the entire content of the dispersion 3. When the α-ZrP particles or the α-TiP particles have the concentration of less than 0.5 wt % with respect to the entire content of the dispersion 3, the optical anisotropy is excessively lowered, and when the α-ZrP particles or the α-TiP particles have the concentration of more than 5 wt % with respect to the entire content of the dispersion 3, the viscosity is increased, and thus, it is difficult to sufficiently express the orientation phenomenon according to the electric field and it is difficult for the particles to be utilized in an optical element.

The dispersion 3 may include water or an organic solvent. At least one of the α-ZrP particles and the α-TiP particles may be dispersed in the organic solvent. The organic solvent may include at least one of acetone, dimethylformamide (DMF), N-methylpyrrolidinone (NMP), methanol, ethanol, isopropyl alcohol, toluene, tetrahydrofuran (THF), and mixtures thereof, but is not limited thereto.

The optical element according to the exemplary embodiment of the present invention may further include a light source unit 500. The light source unit 500 may be positioned on the bottom of the first polarizer 11. The light source unit 500 may include any configuration for emitting light in a direction of the dispersion 3.

The transmissive optical element using the α-ZrP particles or the α-TiP particles having the disk structure may be driven by a method in which the orientation of the α-ZrP particles or the α-TiP particles alternates between a nematic state and an isotropic state in a parallel direction to the electric field by frequency modulation of the electric field applied by the electrodes to control the light transmittance.

For example, when an electric field having a frequency of less than 10 Hz is applied to the α-ZrP particles or the α-TiP particles in the nematic state, the particles are disorderly oriented in an isotropic state. In this case, since the dispersion including the α-ZrP particles or the α-TiP particles does not have a birefringence characteristic, the light is not transmitted. On the other hand, when an electric field having a frequency of 1 kHz or more is applied to the α-ZrP particles or the α-TiP particles in the nematic state, the particles may be oriented in a parallel direction to the electric field with the nematic state. As a result, the dispersion including the α-ZrP particles or the α-TiP particles has a birefringence characteristic and thus, the light transmittance is increased. Accordingly, the α-ZrP particles or the α-TiP particles alternate between the isotropic state and the nematic state in which long axes of the particles are oriented in a parallel direction to the electric field by modulating the frequency to control the light transmittance.

Alternatively, the transmissive optical element using the α-ZrP particles or the α-TiP particles having the disk structure may be driven by the method in which the orientation of the α-ZrP particles or the α-TiP particles alternates between the nematic state and the isotropic state in a vertical direction to the electric field by the frequency modulation of the electric field applied by the electrodes to control the light transmittance.

For example, when an electric field having a frequency of 10 Hz to 1 kHz is applied to the α-ZrP particles or the α-TiP particles in the nematic state, the particles are oriented in the vertical direction to the electric field in the nematic state (anomalous orientation). As a result, the light transmittance of the dispersion including the α-ZrP particles or the α-TiP particles is increased. Accordingly, the α-ZrP particles or the α-TiP particles alternate between the isotropic state and the nematic state in which long axes of the particles are oriented in a vertical direction to the electric field by modulating the frequency to control the light transmittance.

The transmissive optical element using the α-ZrP particles or the α-TiP particles having the disk structure may be driven by a method of controlling the oriented direction of the particles. The transmissive optical element may be driven by a method in which the direction of the electric field applied by the electrodes is parallel to a polarization direction of any one of the first polarizer 11 and the second polarizer 12 or has an angle of 45° with the first polarizer 11 and the second polarizer 12 to control the oriented direction of the particles. In this case, the frequency may be 1 kHz or more and preferably 10 kHz, and the α-ZrP particles or the α-TiP particles may be in the nematic state.

The dispersion 3 according to the exemplary embodiment may contain α-ZrP particles or the α-TiP particles at a concentration of 2 wt % to 5 wt %. After the electric field is applied to the α-ZrP particles or the α-TiP particles according to the exemplary embodiment, the oriented state of the particles may be maintained even though the electric field is removed. When the α-ZrP particles or the α-TiP particles have a concentration lower than 2 wt % with respect to the entire content of the dispersion 3, a time at which the orientation of the particles is maintained even after the electric field is removed is shortened, and when the α-ZrP particles or the α-TiP particles have a concentration higher than 5 wt % with respect to the entire content of the dispersion 3, the viscosity is increased and the orientation according to the electric field is not sufficiently formed, and thus, it is difficult for the particles to be utilized in the optical element.

The dispersion 3 according to the exemplary embodiment may include at least one of the α-ZrP particles or the α-TiP particles including a plurality of layers. The plurality of layers may be 10 to 50 layers.

According to the exemplary embodiment, the dispersion 3 including at least one of the α-ZrP particles or the α-TiP particles including the plurality of layers may contain at least one of the α-ZrP particles or the α-TiP particles with the content of 0.5 wt % to 15 wt %. When the α-ZrP particles or the α-TiP particles have the concentration of less than 0.5 wt % with respect to the entire content of the dispersion 3, the optical anisotropy is excessively lowered, and when the α-ZrP particles or the α-TiP particles have the concentration of more than 15 wt % with respect to the entire content of the dispersion 3, the viscosity is increased and the orientation according to the electric field is not sufficiently formed, and thus, it is difficult for the particles to be utilized in the optical element. In this case, the upper limit concentration of the dispersion that can be driven using the α-ZrP particles or the α-TiP particles including the plurality of layers is higher than the upper limit concentration of the dispersion that can be driven using particles peeled into a single layer.

The α-ZrP particles or the α-TiP particles including the plurality of layers may be in an isotropic state. When the particles are in the isotropic state, the light is not transmitted, but as the applied voltage increases, phase transition occurs from an isotropic state to an anti-nematic state and a birefringence phenomenon occurs and thus, the light is transmitted. The phase or orientation of the α-ZrP particles or the α-TiP particles is controlled by controlling the magnitude of the voltage applied to the electrodes, thereby controlling the light transmittance.

Hereinafter, the α-ZrP particles or the α-TiP particles and physical properties of the transmissive optical element according to the exemplary embodiment will be described with reference to FIGS. 3 to 14.

Figure 3:
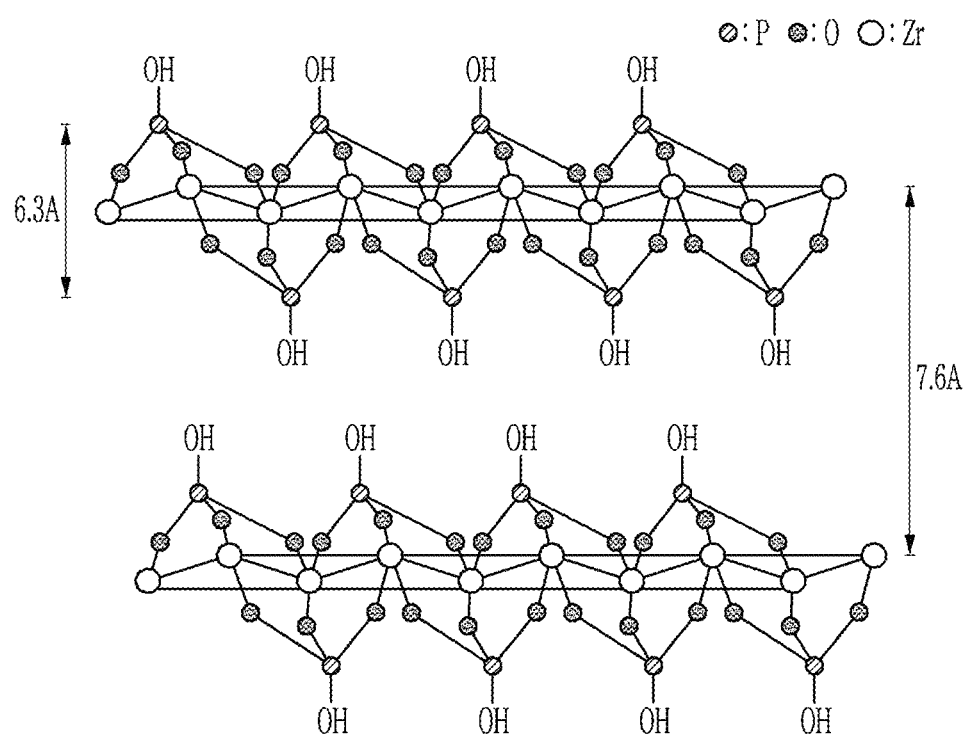
FIG. 3 is a diagram illustrating a structure of synthesized α-ZrP particles.
Figure 4:
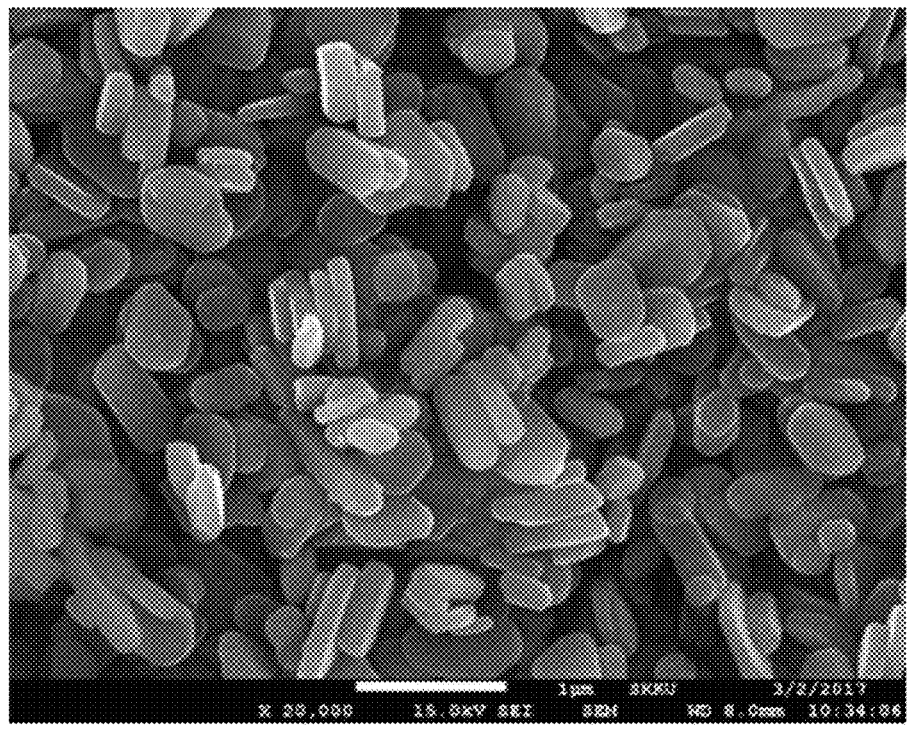
FIG. 4 illustrates an electron micrograph of synthesized α-ZrP particles.

FIG. 3 is a diagram illustrating a structure of synthesized α-ZrP particles and FIG. 4 illustrates an electron micrograph of synthesized α-ZrP particles. As illustrated in FIGS. 3 and 4, the synthesized α-ZrP is a particle having a layered structure and has a flat crystal structure in a substantially hexagonal shape.

Figure 5:
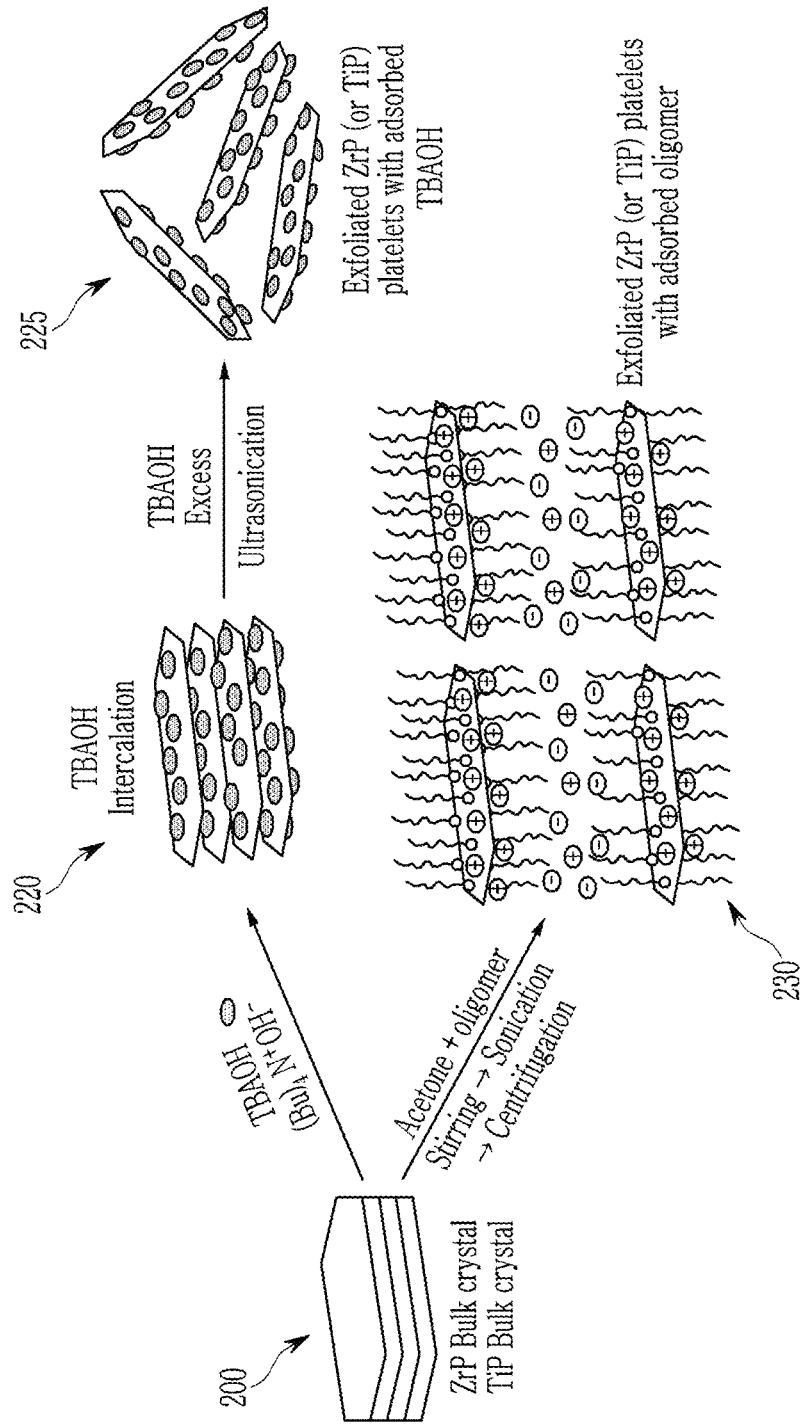
FIG. 5 illustrates a peeling process of synthesized α-ZrP particles or α-TiP particles.

FIG. 5 illustrates a peeling process of synthesized α-ZrP particles or α-TiP particles. As described above, according to the exemplary embodiment of the present invention, a dispersion of peeled α-ZrP particles formed by peeling the synthesized α-ZrP particles may be used, and in another exemplary embodiment, a water-dispersible colloid of the α-ZrP particles before peeling may also be used. In the case of using the dispersion of the peeled α-ZrP particles, a process of peeling the α-ZrP particles may be selectively performed as illustrated in FIG. 5. Further, the peeling process of FIG. 5 may be equally applied even in the peeling of the α-TiP particles.

Referring to FIG. 5, the synthesized ZrP particles or TiP particles have a bulk crystal shape 200 and may have a layered structure. As illustrated in FIG. 3, an OH group adheres to the surface of each α-ZrP layer. Accordingly, when a monomer, an oligomer, or a polymer reacting with OH well is mixed in a solution state, while the α-ZrP particles are peeled, a structure in which the monomer, the oligomer, or the polymer adheres to the surface of each particle may be formed.

For example, the monomer may be tetrabutylammonium hydroxide (TBAOH), and when the TBAOH is mixed with the ZrP particles or the TiP particles in a solution state, intercalation occurs, and as a result, the TBAOH may be inserted (220) between each ZrP layer or TiP layer. Thereafter, when ultrasonication is performed, a disk structure 225 of peeled ZrP or TiP having the TBAOH may be obtained.

Meanwhile, the oligomer is mixed in the solution state, that is, for example, the ZrP particles or the TiP particles are stirred together with acetone and the oligomer, and when centrifugation after sonication is performed, a disk structure 230 of the peeled ZrP or TiP having the oligomer may be obtained.

Figure 6:
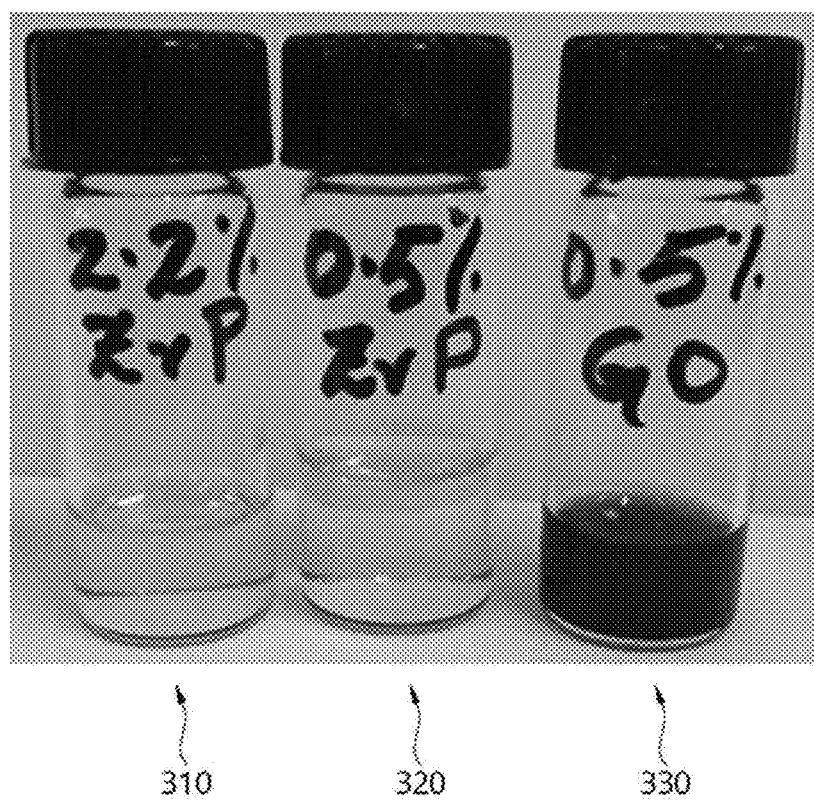
FIG. 6 illustrates a photograph of a dispersion of α-ZrP particles and a graphene oxide dispersion.

FIG. 6 illustrates a photograph of a dispersion of α-ZrP particles and a graphene oxide dispersion. As illustrated in FIG. 6, the synthesized α-ZrP solution having the disk structure is dispersed well in various organic solvents (for example, acetone, N-methylpyrrolidinone (NMP), toluene, etc.). Further, as shown in FIG. 6, a graphene oxide colloid GO, 330 absorbs light in visible light. Particularly, in short-wavelength series, the graphene oxide colloid has a brown color due to high light absorption. Accordingly, when the graphene oxide colloid is used as an electro-optical element, transmission efficiency according to the light absorption is low to cause a reduction in efficiency when used as an LCD.

On the other hand, α-ZrP dispersions 310 and 320 are transparent unlike the graphene oxide dispersion GO, 330. Accordingly, it can be seen that the α-ZrP dispersions 310 and 320 do not absorb the light in the visible light. Equally, the α-TiP dispersion is also transparent in the visible light. Accordingly, it is possible to implement an optical element having higher light transmission efficiency than the optical element using the graphene oxide dispersion.

Figure 7:
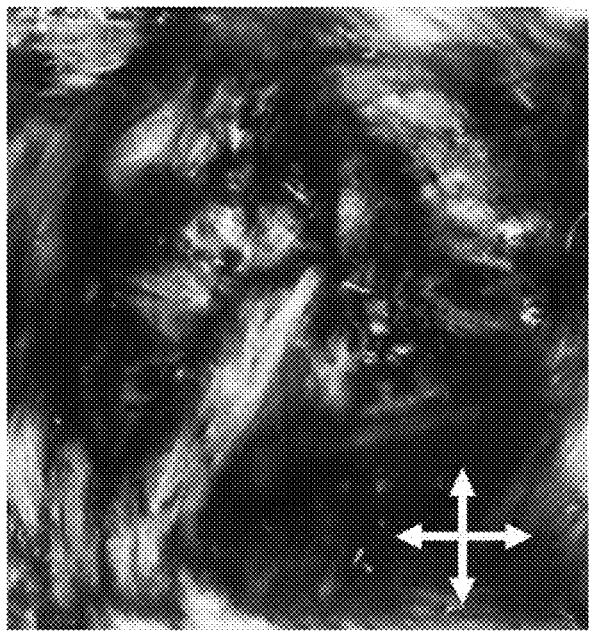
FIG. 7 is a photograph of a cell including a dispersion of α-ZrP particles which is observed by a polarizing microscope.

FIG. 7 is a photograph of a cell including a dispersion including α-ZrP particles which is observed by a polarizing microscope. It was confirmed that the dispersion including the α-ZrP particles is injected into the cell and has a birefringence pattern as illustrated in a transmissive micrograph observed through a polarization microscope. This means that the dispersion according to the exemplary embodiment is in a nematic state with spontaneous orientation.

In the optical element according to the exemplary embodiment, the orientation or phase of the α-ZrP particles or the α-TiP particles is controlled in response to the applied electric field, thereby adjusting the light transmittance.

Figure 8:
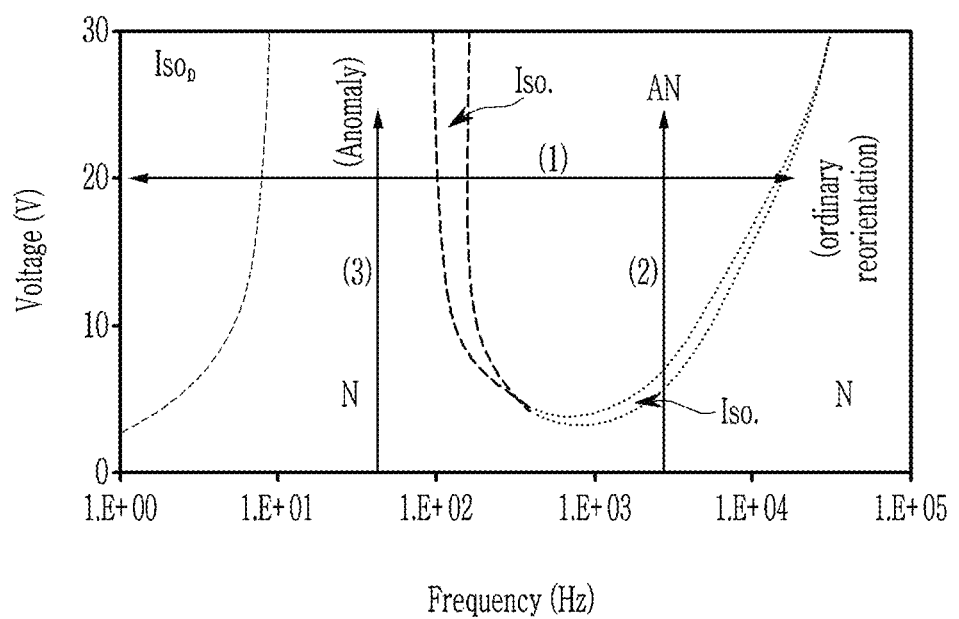
FIG. 8 is a graph illustrating a phase and orientation of a dispersion of α-ZrP particles according to a frequency and a voltage of an applied electric field.

FIG. 8 illustrates the orientation and the phase of α-ZrP particles according to a frequency and a voltage of an electric field applied from the electrodes. The dispersion of FIG. 8 contains 0.6 wt % of α-ZrP particles. In FIG. 8, Iso. means an isotropic state in which the particles are disorderly oriented. AN means an anti nematic state. This means a state in which the long axes of the particles are oriented in parallel to the electric field, but a normal vector of a particle surface is oriented on the vertical surface of the electric field without any regular rule. N means a nematic state. The α-ZrP particles or the α-TiP particles in the nematic state are oriented in a direction in which the long axes of the particles are parallel to the electric field, but when the electric field of a frequency of about 10 Hz to 100 Hz is applied, the α-ZrP particles or the α-TiP particles are oriented in a direction in which the long axes of the particles are vertical to the electric field regardless of the voltage (anomalous orientation).

In a state graph illustrated in FIG. 8, each region may move in a horizontal or vertical direction according to a material type and a concentration. For example, the anomalous orientation state is shown at 10 Hz to 100 Hz in FIG. 8, but may be shown in a region of 10 Hz to 1 kHz in a material having a different concentration or size. Further, in some cases, a boundary between the anti nematic (AN) state and the nematic state illustrated in a high frequency region is ambiguous, and the nematic state in which the particles are oriented in parallel to the electric field is shown in a region of more than 1 kHz. The anti nematic state and the nematic state have an optically similar property due to the largest refractive index in the electric field direction.

A conventional liquid crystal display (LCD) uses a phenomenon in which a polarization characteristic is changed when polarized light passes through a liquid crystal having a birefringence characteristic. The optical element according to the exemplary embodiment has also a birefringence characteristic when the α-ZrP particles or the α-TiP particles are in the nematic state. As a result, when the polarized light passes through the dispersion, the polarization characteristic is changed and thus, the light transmittance is increased. On the other hand, when the α-ZrP particles or the α-TiP particles are in the isotropic state, the particles are disorderly oriented and thus, the light is not transmitted between the polarizers perpendicular to each other. Accordingly, the light transmittance is increased or decreased by controlling the phase or orientation of the α-ZrP particles or the α-TiP particles, thereby implementing the optical element.

As described above, when the α-ZrP particles or the α-TiP particles are in the nematic state, the particles are oriented in one direction to have a birefringence characteristic and the light transmittance is increased. However, the orientation direction of the particles in the nematic state is vertical or parallel to the electric field direction according to a frequency of the applied electric field. Particularly, when the frequency of the applied electric field is 1 kHz or more, the particles are oriented in a parallel direction to the electric field, and when the frequency of the applied electric field is 10 Hz to 1 kHz, the particles are maintained in the nematic state and oriented in a vertical direction to the electric field. Hereinafter, a driving principle of the optical element using the nematic state and the isotropic state of the α-ZrP particles or the α-TiP particles will be described.

Figure 9A:
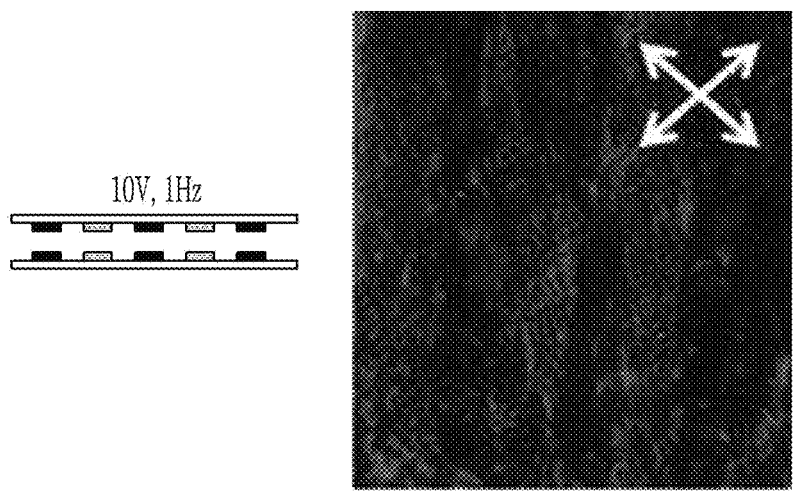
FIG. 9A is a photograph illustrating a light transmittance at the time of applying an electric field of 1 Hz frequency.
Figure 9B:
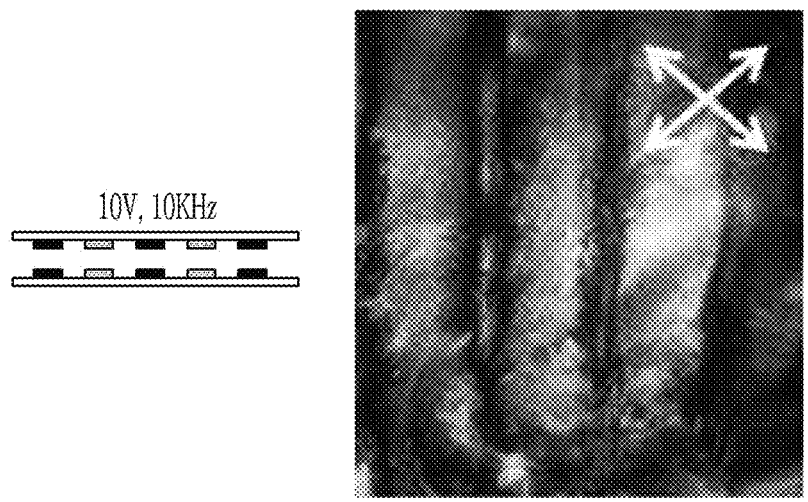
FIG. 9B is a photograph illustrating a light transmittance at the time of applying an electric field of 10 kHz frequency.

FIGS. 9A and 9B are photographs illustrating light transmittances between polarizers perpendicular to each other, at the time of fixing a voltage to 10 V and applying an electric field having a frequency of 1 Hz and an electric field having a frequency of 10 kHz, respectively.

According to FIG. 9A, when the electric field having the frequency of 1 Hz is applied to the α-ZrP particles or the α-TiP particles in the nematic state, the light is not transmitted and thus, the photograph looks dark. This means that the α-ZrP particles or the α-TiP particles are disorderly oriented to be in an isotropic state and thus, the birefringence characteristic is not shown. On the other hand, according to FIG. 9B, when the electric field having the frequency of 10 kHz is applied to the α-ZrP particles or the α-TiP particles in the nematic state, the light is transmitted and the photograph looks bright. This means that while the α-ZrP particles or the α-TiP particles are maintained in the nematic state, the long axes of the particles are oriented in a parallel direction to the electric field and the birefringence characteristic is shown.

Figure 10A:
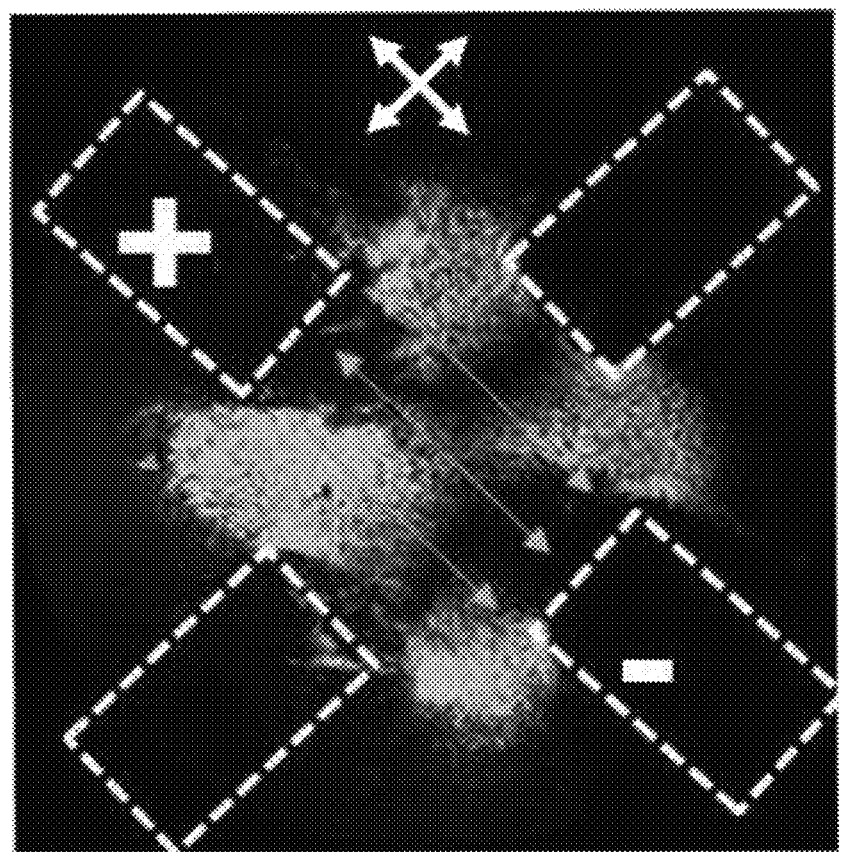
FIG. 10A is a photograph illustrating a light transmittance when the direction of the electric field is parallel to the direction of a polarizer.
Figure 10B:
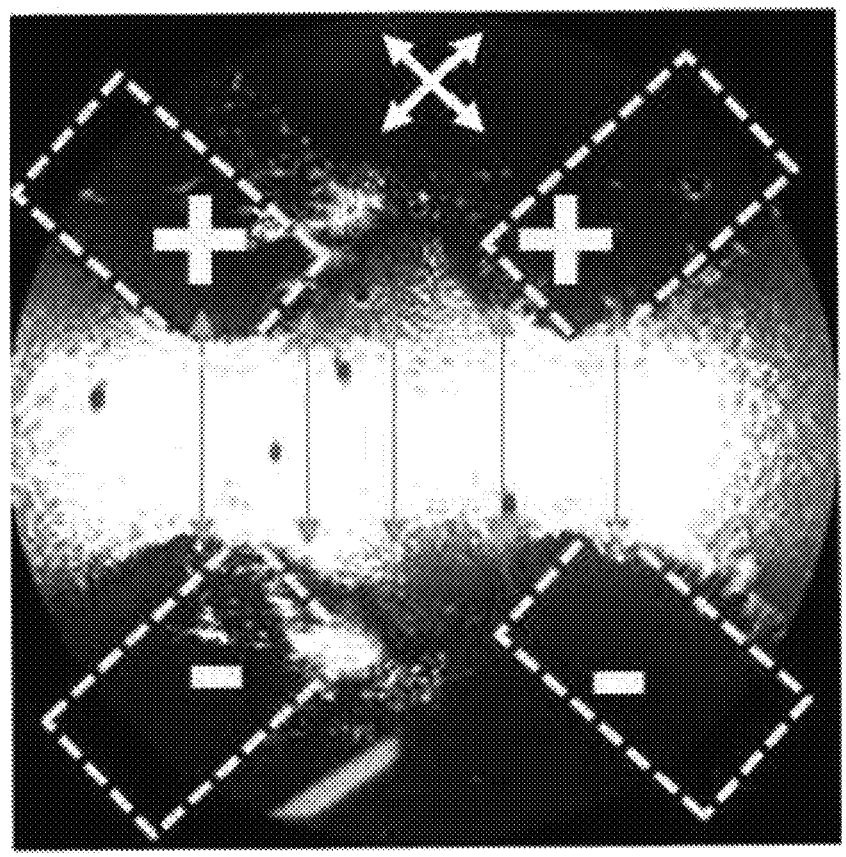
FIG. 10B is a photograph illustrating a light transmittance when the direction of the electric field forms an angle of 45° with a polarizer.

FIGS. 10A and 10B are photographs illustrating light transmittances when the dispersion including α-ZrP particles is injected between the perpendicular polarizers, the voltage is 10 V, and the electric field having a frequency of 10 kHz is applied by varying a direction. FIG. 10A is a photograph illustrating a light transmittance when the direction of the electric field is parallel to the direction of the polarizer, and FIG. 10B is a photograph illustrating a light transmittance when the direction of the electric field forms an angle of 45° with the polarizer.

When the electric field having a frequency of 10 kHz is applied, the α-ZrP particles or the α-TiP particles are maintained in the nematic state and the long axes of the particles are oriented in parallel to the electric field. When the direction of the electric field is parallel to the polarizer, the α-ZrP particles or the α-TiP particles are oriented in parallel to the direction of the polarizer and the light is not transmitted. On the other hand, when the direction of the electric field forms an angle of 45° with the polarizer, the α-ZrP particles or the α-TiP particles form an angle of 45° with the polarizer and the light is transmitted. Accordingly, the optical element may be driven by controlling the orientation direction of the particles so that the electric field direction forms an angle of 180° with the polarization direction or an angle of 45° with the polarization direction.

Figure 11A:
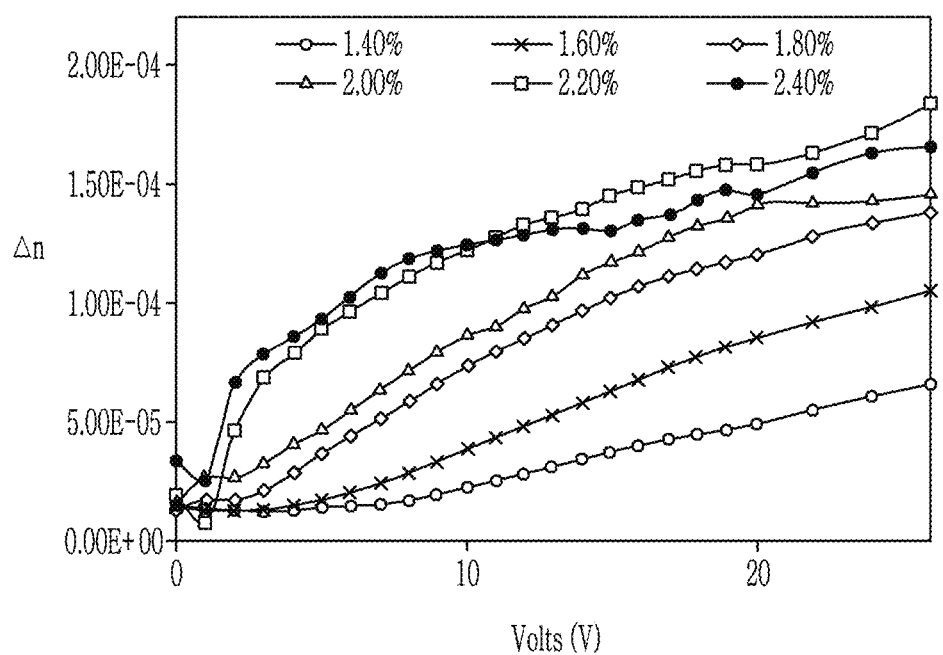
FIG. 11A is a graph illustrating a refractive index anisotropy change at the time of applying a voltage to the cell of FIG. 1.
Figure 11B:
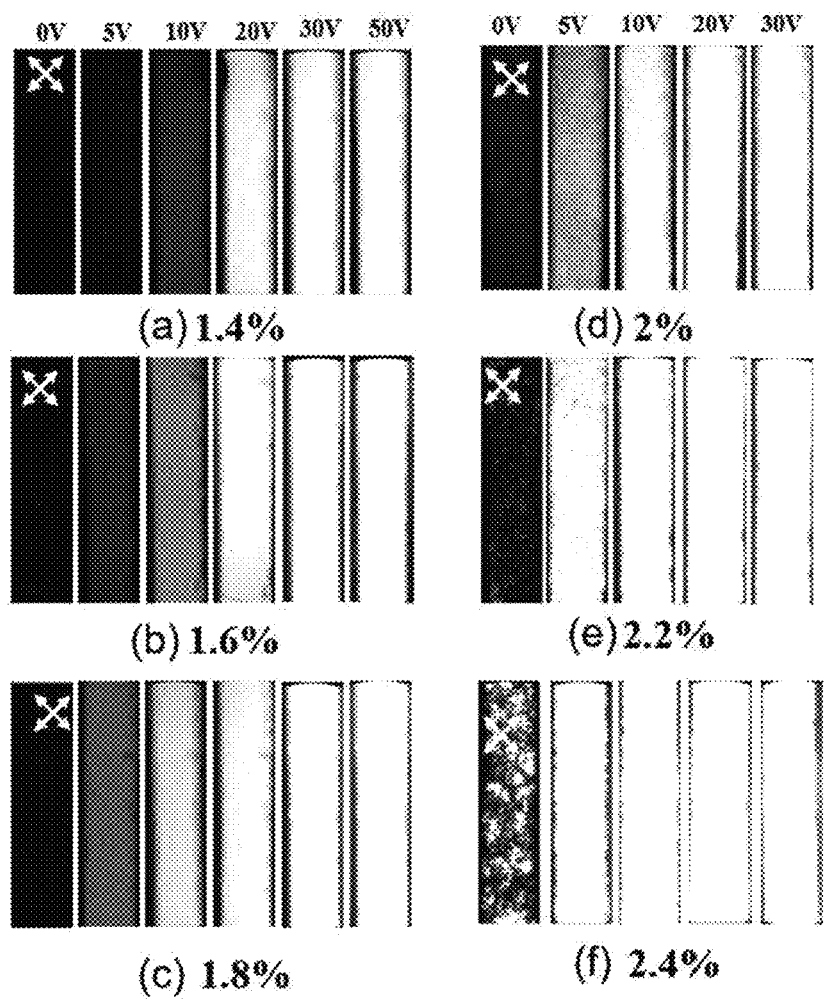
FIG. 11B is a photograph illustrating a change in light transmittance at the time of applying a voltage to the cell of FIG. 1.

Next, FIG. 11A is a graph illustrating refractive index anisotropy according to a magnitude of a voltage between two polarizers when the voltage is applied to the dispersion including the peeled α-ZrP particles using a monomer. FIG. 11B is a photograph illustrating a change in light transmittance according to a voltage magnitude. In this case, an electric field of a frequency of about 10 kHz was used.

Referring to FIGS. 11A and 11B, in all cases (1.40%, 1.60%, 1.80%, 2.00%, 2.20%, and 2.40%) according to a concentration of the dispersion, as the voltage is applied, the refractive index anisotropy is increased, and as the refractive index anisotropy is increased, the light transmittance is also increased. Accordingly, it can be seen that the refractive index anisotropy is electrically controlled even in the dispersion including the α-ZrP particles similarly to the graphene oxide solution.

As the concentration of the graphene oxide colloid is increased, the viscosity is rapidly increased and a region actually available for an LCD is within 1 wt %. If the concentration is not further increased, there is a problem in that a cell gap needs to be increased to enhance the whole birefringence.

Unlike this, it was confirmed that the dispersion of the α-ZrP particles or the α-TiP particles according to the exemplary embodiment is well oriented according to the electric field even at a concentration of 5 wt %. Such a difference may be a phenomenon shown because the α-ZrP has a relatively low viscosity and a repulsive force between the particles is small. In the case of using the dispersion including the α-ZrP particles according to the exemplary embodiment, it can be seen that even in a high-concentration nematic state, electric driving is possible.

Figure 12A:
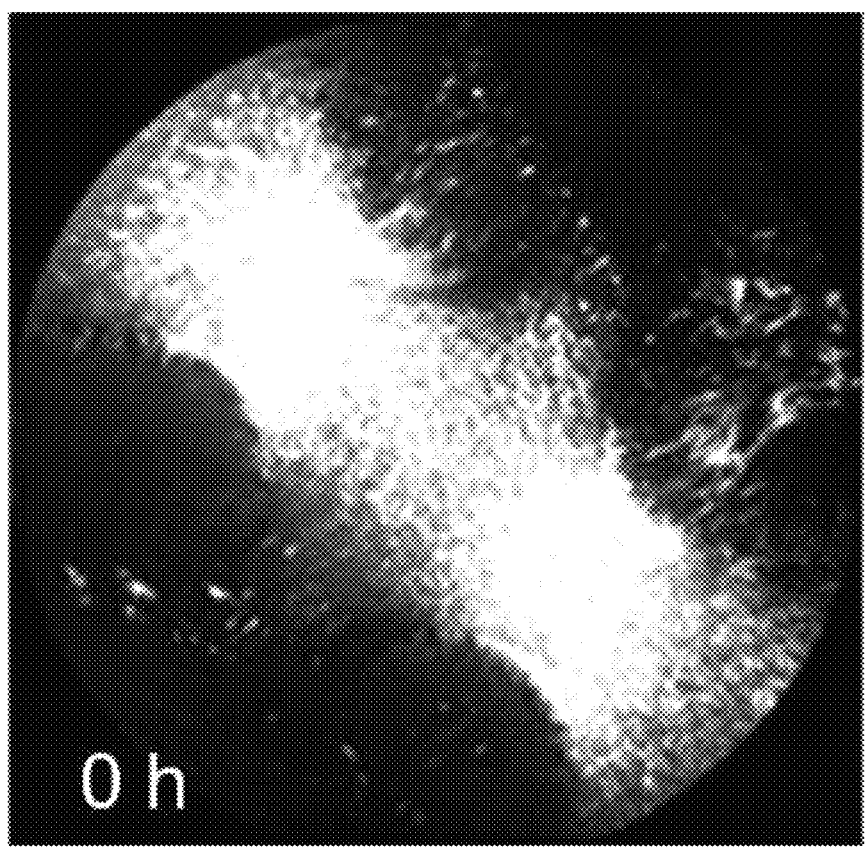
FIG. 12A is a photograph illustrating a light transmittance immediately after a voltage is removed.
Figure 12B:
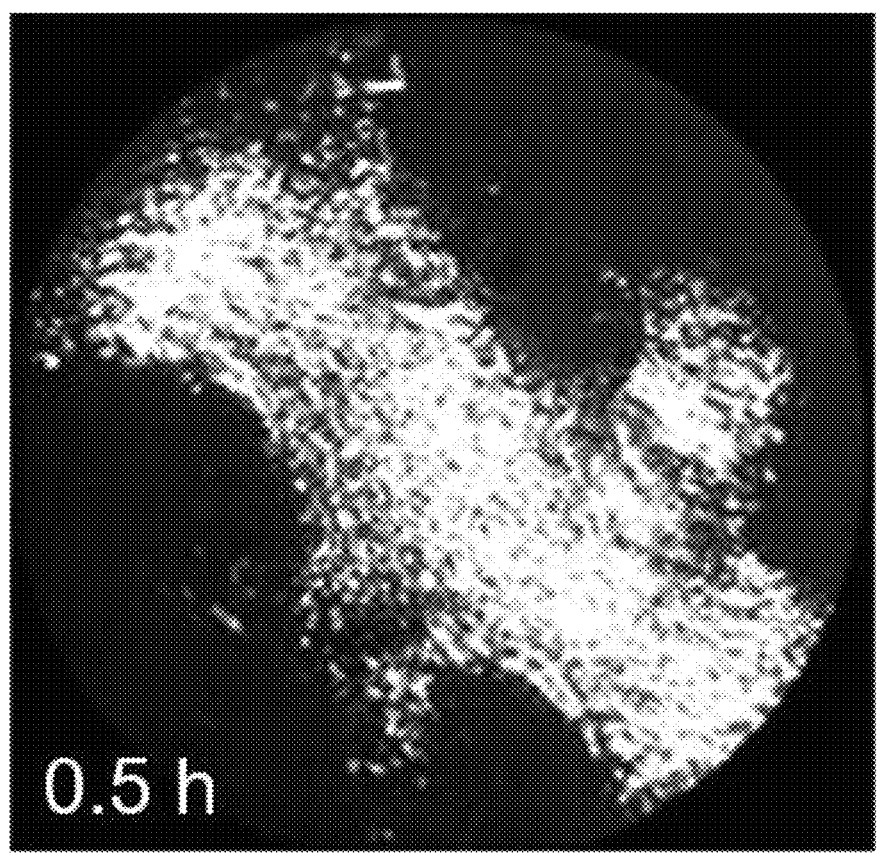
FIG. 12B is a photograph illustrating a light transmittance after the voltage is removed and a predetermined time period elapses.

FIG. 12A is a photograph illustrating a light transmittance immediately after a voltage is removed and FIG. 12B is a photograph illustrating a light transmittance after the voltage is removed and a predetermined time period elapses.

It can be seen that a high light transmittance is maintained even after the voltage is removed and 30 minutes elapse as illustrated in FIG. 12B as well as immediately after the voltage is removed as illustrated in FIG. 12A. This means that even after the voltage is removed, the orientation of the α-ZrP particles or the α-TiP particles is not in disorder or changed, but maintained. Accordingly, it is possible to implement an optical element in which after a screen is displayed, the screen that has already been displayed does not disappear and is maintained even through a driving signal is removed.

The optical element according to the exemplary embodiment may be applied to a low-power consumption display and may be particularly useful for a low-voltage display requiring a relatively simple display form.

Figure 13:
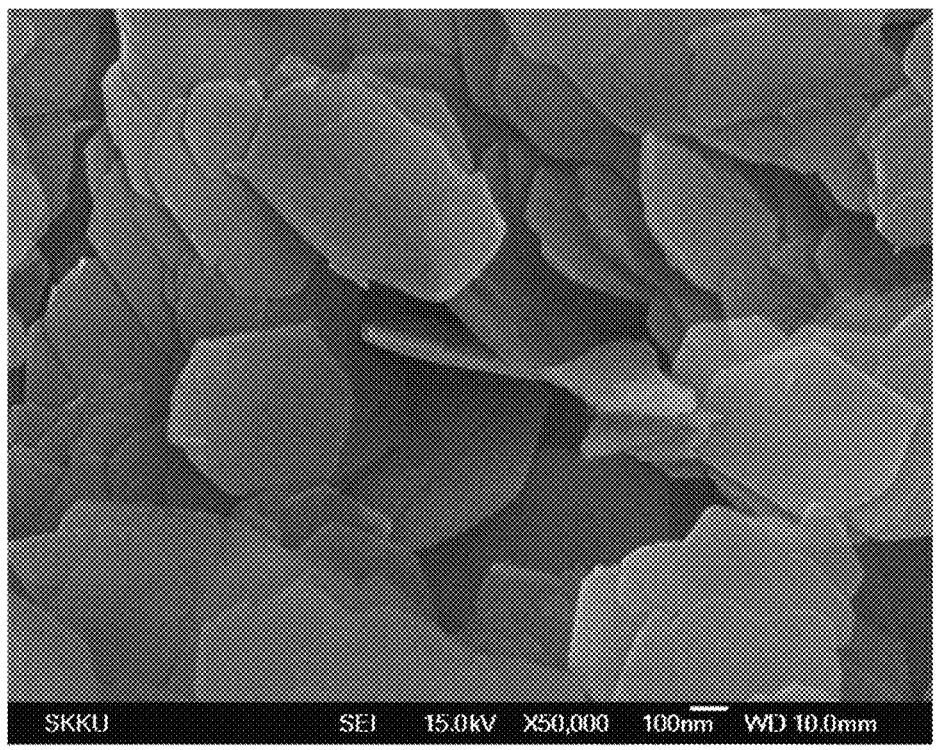
FIG. 13 illustrates an electron micrograph of a water-dispersible colloid of unpeeled TiP particles.

FIG. 13 illustrates an electron micrograph of a water-dispersible colloid of unpeeled TiP particles.

As illustrated in FIG. 13, α-TiP particles including a plurality of layers may be configured by about 20 layers. A thickness of the α-TiP particles including the plurality of layers may be about 20 nm. Since such a material is not subjected to the peeling process, the material may be more easily prepared. In addition, the concentration of the α-ZrP particles or the α-TiP particles included in the dispersion 3 may be increased up to 15 wt % to provide a more improved birefringence characteristic.

Figure 14:
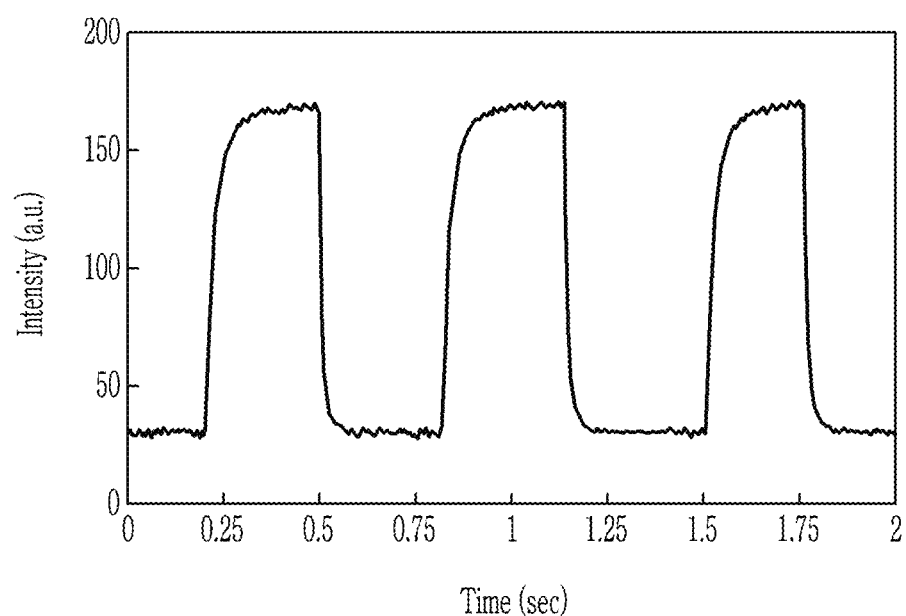
FIG. 14 is a graph illustrating an electro-optical characteristic of unpeeled TiP particles.

FIG. 14 illustrates an electro-optical characteristic of unpeeled TiP particles. According to FIG. 14, it can be seen that the α-TiP particles including the plurality of layers sensitively react with the electric field and thus, the switching reaction by the electric field is possible.

Reflective Optical Element

Figure 15:
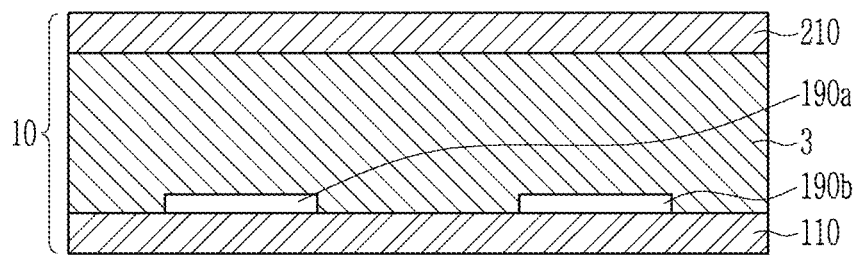
FIG. 15 illustrates a configuration of a reflective optical element including a horizontal electric field according to an exemplary embodiment of the present invention.

FIG. 15 illustrates a configuration of a reflective optical element including a horizontal electric field according to an exemplary embodiment of the present invention.

As illustrated in FIG. 15, an optical element according to an exemplary embodiment of the present invention includes a cell 10, and the cell 10 includes a first substrate 110 and a second substrate 210 facing each other, electrodes 190a and 190b positioned between the first substrate 110 and the second substrate 210, and a dispersion 3 including at least one of peeled α-ZrP particles and peeled α-TiP particles. The arrangement or the number of electrodes 190a and 190b may vary depending on an exemplary embodiment, and the electrodes 190a and 190b may include any shape capable of forming an electric field for controlling the orientation of the particles included in the dispersion 3. An insulation layer may be further included between the electrodes 190a and 190b and the dispersion 3.

The electrodes 190a and 190b may include a pixel electrode 190a and a common electrode 190b. The pixel electrode 190a and the common electrode 190b may be positioned on the same substrate. The electric field may include a plurality of directional components including a vertical component and a horizontal component to the substrate, and a light reflectance may be easily controlled due to the photonic crystal of the dispersion 3 by orienting the particles in parallel or vertically to the direction of the electric field.

Figure 16:
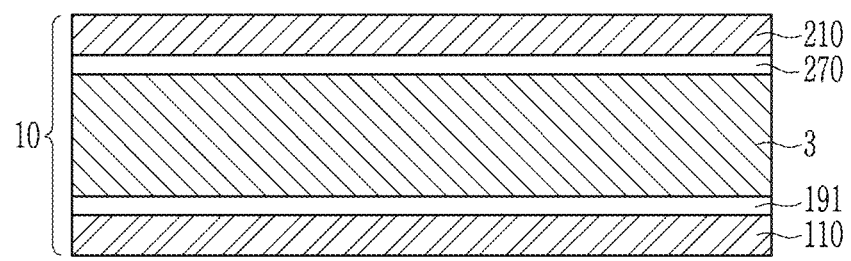
FIG. 16 illustrates a configuration of a reflective optical element including a vertical electric field according to an exemplary embodiment of the present invention.

FIG. 16 illustrates a configuration of a reflective optical element including a vertical electric field according to an exemplary embodiment of the present invention.

A reflective optical element including a vertical electric field according to an exemplary embodiment includes a cell 10 which includes a first substrate 110 and a second substrate 210, electrodes 191 and 270 positioned between the first substrate 110 and the second substrate 210, and a dispersion 3. The remaining configurations except for the positions of the electrodes 191 and 270 are the same as those of FIG. 15, and thus, the description thereof will be omitted. The electrodes 191 and 270 may include a pixel electrode 191 and a common electrode 270. The pixel electrode 191 is positioned on the first substrate 110 and the common electrode 270 may be positioned on the second substrate 210. A separate insulation layer may be included between the pixel electrode 191 and the dispersion 3 and a separate insulation layer may also be included between the common electrode 270 and the dispersion 3. The electric field may include a plurality of directional components including a vertical component and a horizontal component to the substrate, and a light reflectance due to photonic crystal of the dispersion 3 may be easily controlled by orienting the particles in parallel or vertically to the direction of the electric field.

The optical element according to the exemplary embodiment illustrated in FIGS. 15 and 16 includes the dispersion 3 positioned between the two substrates. The dispersion 3 may include at least one of α-ZrP particles or α-TiP particles. The dispersion 3 according to the exemplary embodiment controls a light reflectance by adjusting the orientation or phase of at least one of α-ZrP particles or α-TiP particles.

The α-ZrP particles or the α-TiP particles included in the dispersion 3 may be in a lamellar state.

The α-ZrP particle and the α-TiP particle according to the exemplary embodiment may have a disk structure. The disk structure may refer to a particle having a single layer form and a thickness of about 1 nm.

A polymer or oligomer having a molecular weight of 500 or more may bind to the surface of the α-ZrP particle and the α-TiP particle according to the exemplary embodiment. The polymer or oligomer may serve to adjust a distance between the particles and improve a photo grid reflectance.

The α-ZrP particles or the α-TiP particles may have a concentration of 0.3 wt % to 1.5 wt % with respect to the entire content of the dispersion 3. When the particles have the concentration of less than 0.3 wt % or more than 1.5 wt % with respect to the entire content of the dispersion 3, a gap between the particles does not show reflection in a visible light region and thus, it is difficult for the particles to be utilized in the optical element.

A color of the photonic crystal may be determined according to a concentration of the α-ZrP particles or the α-TiP particles with respect to the entire content of the dispersion 3 according to the exemplary embodiment. The lower the concentration, red-colored light is reflected, and the higher the concentration, blue-colored light is reflected.

The α-ZrP particles or the α-TiP particles may be dispersed in an organic solvent. The organic solvent may include at least one of acetone, dimethylformamide (DMF), N-methylpyrrolidinone (NMP), methanol, ethanol, isopropyl alcohol, toluene, tetrahydrofuran (THF), and mixtures thereof.

As an example of the reflective optical element of the exemplary embodiment using the α-ZrP particles or the α-TiP particles having the disk structure, the optical element may control the light reflectance while the orientation of the α-ZrP particles or the α-TiP particles alternates between a lamellar state in a parallel direction to the electric field and an isotropic state or alternates between the lamellar state in the parallel direction to the electric field and an anti-nematic state by modulating a frequency of the electric field applied by the electrodes. Since repeated photonic crystal switching is possible, it is also possible to turn on/off the color reflection depending on the photonic crystal by controlling the frequency of the voltage applied to the electrode.

For example, in the horizontal electric field type optical element of FIG. 15, when an electric field having a frequency of less than 10 Hz is applied to the α-ZrP particles or the α-TiP particles in the lamellar state, the particles are disorderly oriented in an isotropic state. In this case, light of a specific wavelength including the α-ZrP particles or the α-TiP particles is not reflected. On the other hand, when an electric field having a frequency of more than 1 kHz is applied to the α-ZrP particles or the α-TiP particles in the lamellar state, the particles are maintained in the lamellar state and uniformly oriented in a horizontal direction to the electric field. As a result, the particles are oriented horizontally to the substrate and the dispersion including the α-ZrP particles or the α-TiP particles reflects the light having the specific wavelength. Accordingly, the α-ZrP particles or the α-TiP particles alternate between the isotropic state and the lamellar state in which the long axes of the particles are oriented in a parallel direction to the electric field or alternate between the anti-nematic state and the lamellar state in which the long axes of the particles are oriented in the parallel direction to the electric field by modulating the frequency, thereby controlling the light transmittance.

The optical element using the lamellar state in which the particles are oriented in the parallel direction to the electric field may be configured so that the pixel electrode 190a and the common electrode 190b are positioned on the same substrate. When the α-ZrP particles or the α-TiP particles are oriented in the parallel direction to the electric field, the particles are maintained in the lamellar state and oriented in parallel to the substrate, thereby easily controlling the light reflectance due to photonic crystal. However, in this case, the light reflectance is controlled only between the electrodes and not controlled at the upper portion of the electrode, and thus, there is a disadvantage in that light efficiency is somewhat low.

Alternatively, as an example of the reflective optical element of the exemplary embodiment using the α-ZrP particles or the α-TiP particles having the disk structure, the optical element may control the light reflectance while the orientation of the α-ZrP particles or the α-TiP particles alternates between a lamellar state in a vertical direction to the electric field and an isotropic state or alternates between the lamellar state in the vertical direction to the electric field and an anti-nematic state by modulating a frequency of the electric field applied by the electrodes.

For example, in the optical element of FIG. 16 using the vertical electric field, when an electric field having a frequency of 10 Hz to 1 kHz is applied to the α-ZrP particles or the α-TiP particles in the lamellar state, the particles are maintained in the lamellar state and anomalously oriented in the vertical direction to the electric field. As a result, the light having a specific wavelength may be reflected. On the other hand, when the electric field having a frequency of more than 1 kHz is applied, while the particles are oriented vertically to the substrate, the photonic crystal orientation is disordered and thus, the reflection of the light does not occur. In the anomalous orientation shown in the photonic crystal material, unlike an existing phenomenon, the particles are stably oriented without flow or vibration and form a uniform lamellar state in a vertical direction to the electric field. Accordingly, it is possible to obtain a rigid layered structure and obtain a fast response speed and a high contrast ratio. Accordingly, the α-ZrP particles or the α-TiP particles alternate between the isotropic state and the lamellar state in which the long axes of the particles are anomalously oriented in a vertical direction to the electric field or alternate between the anti-nematic state and the lamellar state in which the long axes of the particles are anomalously oriented in a vertical direction to the electric field by modulating the frequency, thereby controlling the light transmittance.

The optical element using the anomalous orientation phenomenon in which the particles are oriented in the vertical direction to the electric field may be configured so that the pixel electrode 191 and the common electrode 270 face each other on the first substrate 110 and the second substrate 210. When the α-ZrP or α-TiP particles are oriented in the vertical direction to the electric field, the particles are maintained in the lamellar state and oriented in a parallel direction to the substrate to facilitate the reflectance control by the photonic crystal. In this case, since the reflectance is adjusted in the entire region with the electrodes, the light efficiency is higher than that of the horizontal electric field element described above.

The oriented state of the particles according to the exemplary embodiment may be maintained even though the electric field is removed after the electric field is applied.

Hereinafter, physical properties of the reflective optical element according to the exemplary embodiment will be described with reference to FIGS. 17 to 21.

Figure 17:
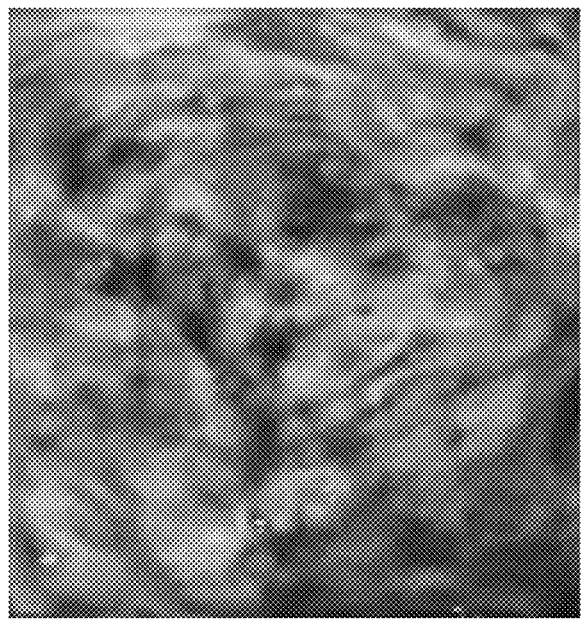
FIG. 17 is a photograph of a cell including a dispersion of α-ZrP particles which is observed by a reflective microscope.

FIG. 17 is a photograph having a specific reflective color which is observed by a reflective microscope. The distances between the particles are regularly arranged by controlling a length of the polymer binding to the α-ZrP particles or the α-TiP particles having the disk structure or controlling the concentration of the dispersion to express a photonic crystal phenomenon which reflects light having a specific wavelength. The photonic crystal phenomenon means that the particles may have a lamellar state having a layered structure. When the particles are oriented in the horizontal direction to the substrate in the lamellar state, the light having a specific wavelength may be reflected without a separate color filter.

Figure 18:
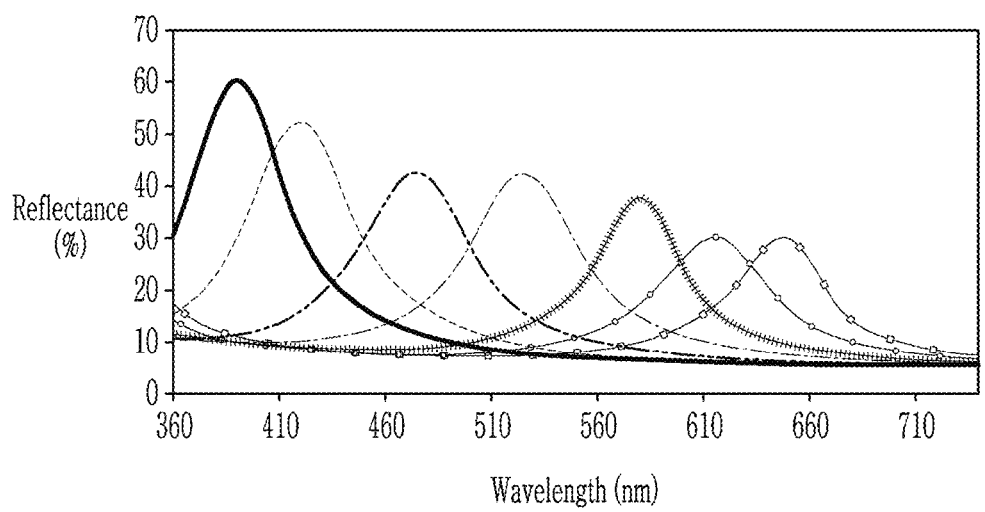
FIG. 18 illustrates a light reflectance due to photonic crystal in different wavelengths.

FIG. 18 illustrates a light reflectance due to photonic crystal in different wavelengths. As illustrated in FIG. 18, in a colloid photonic crystal material including the α-ZrP particles or the α-TiP particles, the maximum value of the light reflectance is about 30% to 60%. This value is a value which is equal to or more than 10 times greater than the graphene oxide material. Such a color reflection may be generated or removed by applying an electric signal.

Figure 19:
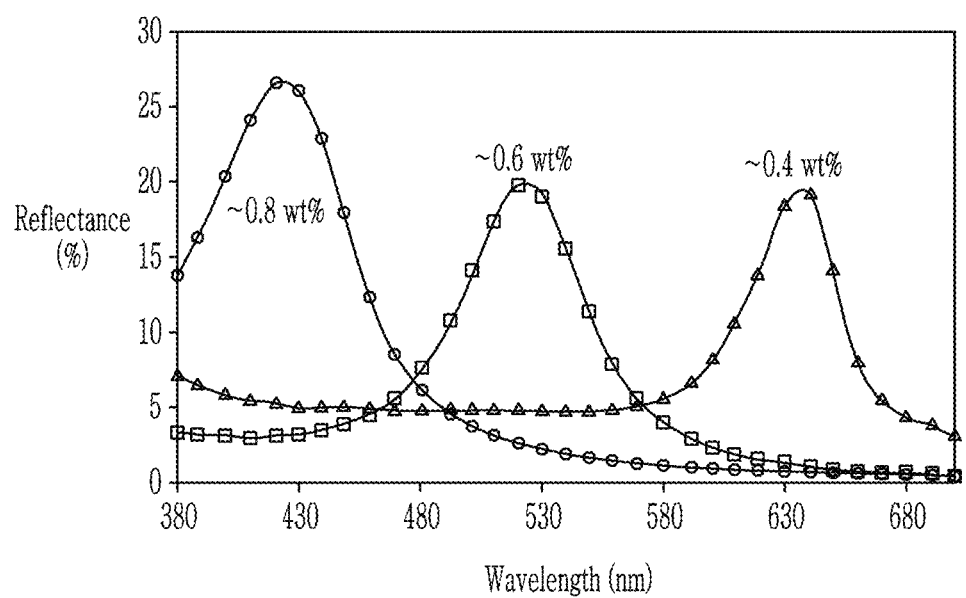
FIG. 19 illustrates a reflective spectrum according to a concentration of a dispersion of α-ZrP particles.

FIG. 19 illustrates a reflective spectrum according to a concentration of α-ZrP particles binding with a polymer with respect to the entire content of the dispersion. According to FIG. 19, it can be seen that as the concentration of the α-ZrP particles included in the dispersion is increased, the particles move from a long wavelength to a short wavelength of the reflective light. That is, as the concentration of α-ZrP particles is decreased, red-colored light is reflected and as the concentration is increased, blue-colored light is reflected. Accordingly, it can be seen that the reflective optical element can be driven without a color filter by controlling the concentration of the particles included in the dispersion.

Figure 20A:
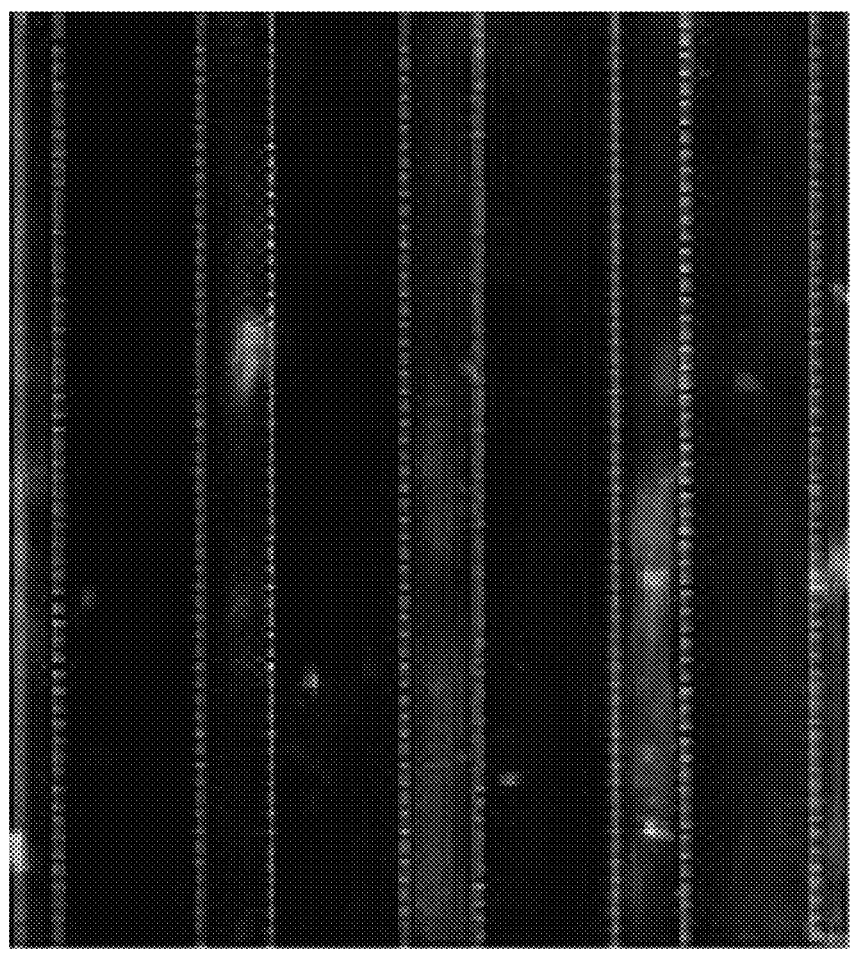
FIG. 20A is a photograph illustrating a light reflectance at the time of applying an electric field of 1 Hz frequency.
Figure 20B:
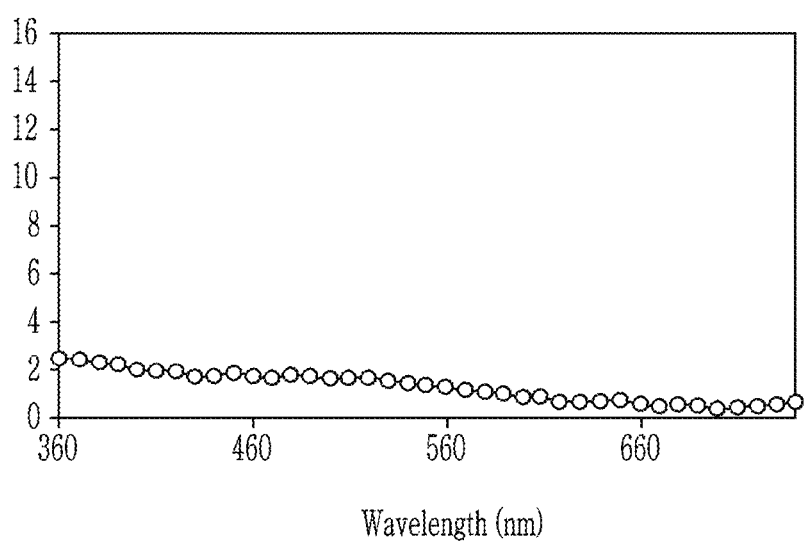
FIG. 20B is a graph illustrating a light reflectance at the time of applying an electric field of 1 Hz frequency.

FIG. 20A is a photograph and FIG. 20B is a graph illustrating light reflectances according to a frequency of a dispersion having a photonic crystal characteristic and including peeled α-ZrP particles using the horizontal electric field type optical element (FIG. 15). Particularly, FIGS. 20A and 20B illustrate light reflectances when the voltage is fixed to 10 V and an electric field having a frequency of 1 Hz is applied.

Figure 20C:
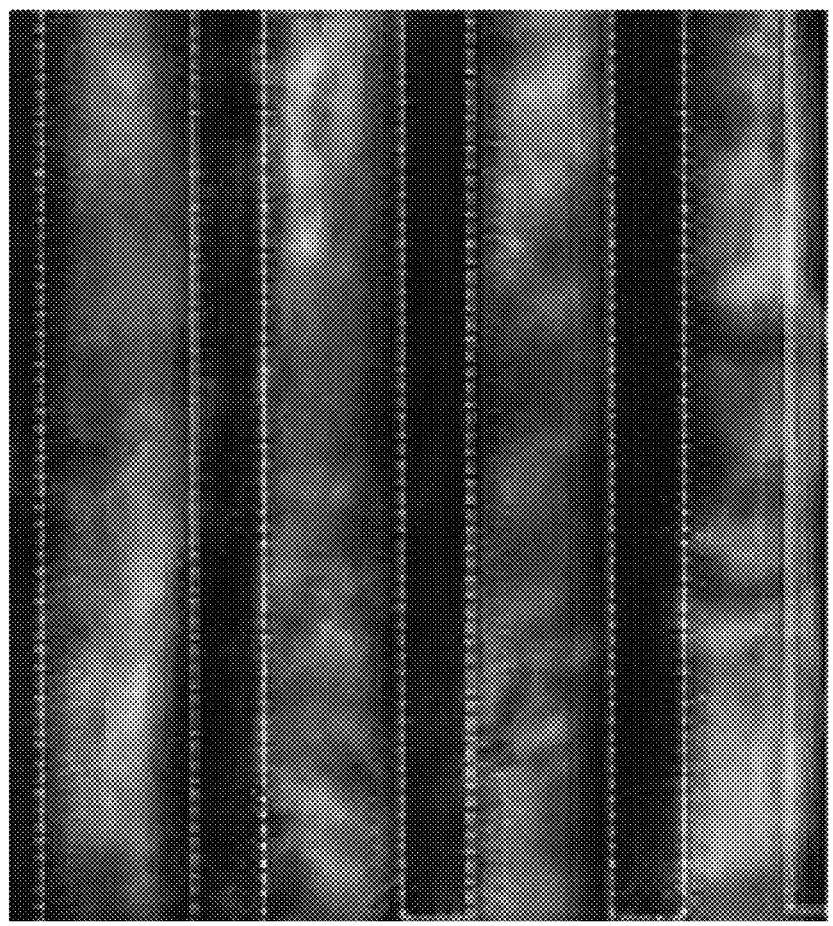
FIG. 20C is a photograph illustrating a light reflectance at the time of applying an electric field of 10 kHz frequency.
Figure 20D:
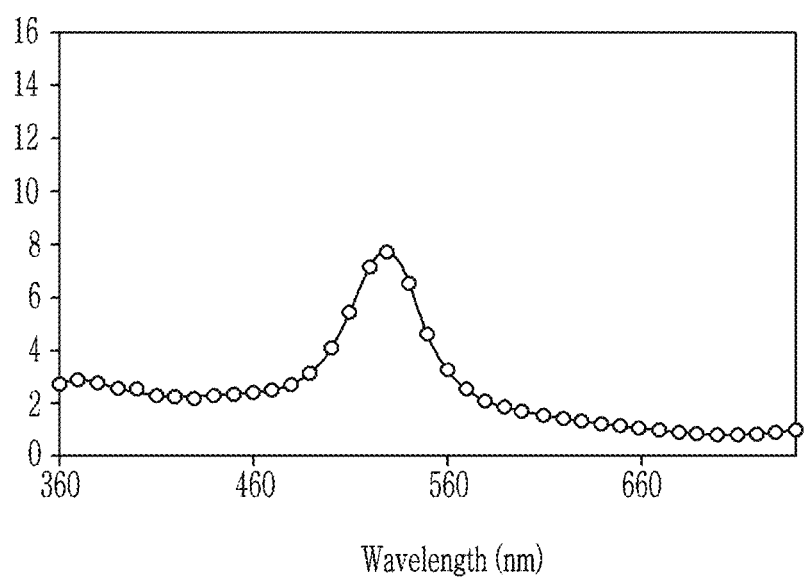
FIG. 20D is a graph illustrating a light reflectance at the time of applying an electric field of 10 kHz frequency.

FIG. 20C is a photograph and FIG. 20D is a graph illustrating light reflectances according to a frequency of a dispersion having a photonic crystal characteristic and including peeled α-ZrP particles using the horizontal electric field type optical element (FIG. 15). Particularly, FIGS. 20C and 20D illustrate light reflectances when the voltage is fixed to 10 V and an electric field having a frequency of 10 kHz is applied.

As can be seen in FIGS. 20A and 20B, when the electric field having a low frequency (1 Hz) is applied, while a weak flow is formed in the α-ZrP dispersion that has been shown in the lamellar state, the photonic crystal is disordered and the color reflection disappears. This means that the particles are transited from the lamellar state to the isotropic state by the electric field having the low frequency.

On the other hand, as can be seen in FIGS. 20C and 20D, when the electric field having the high frequency (10 kHz) is applied again, the phenomenon of reflecting the light having the specific wavelength is reproduced. This means that when the high-frequency electric field is applied, the particles may be recovered from the isotropic state to the lamellar state in which the particles have the layered structure in the parallel direction to the electric field.

It can be seen that the photonic crystal switching may be repeatedly implemented through FIGS. 20A, 20B, 20C and 20D.

Figure 21:
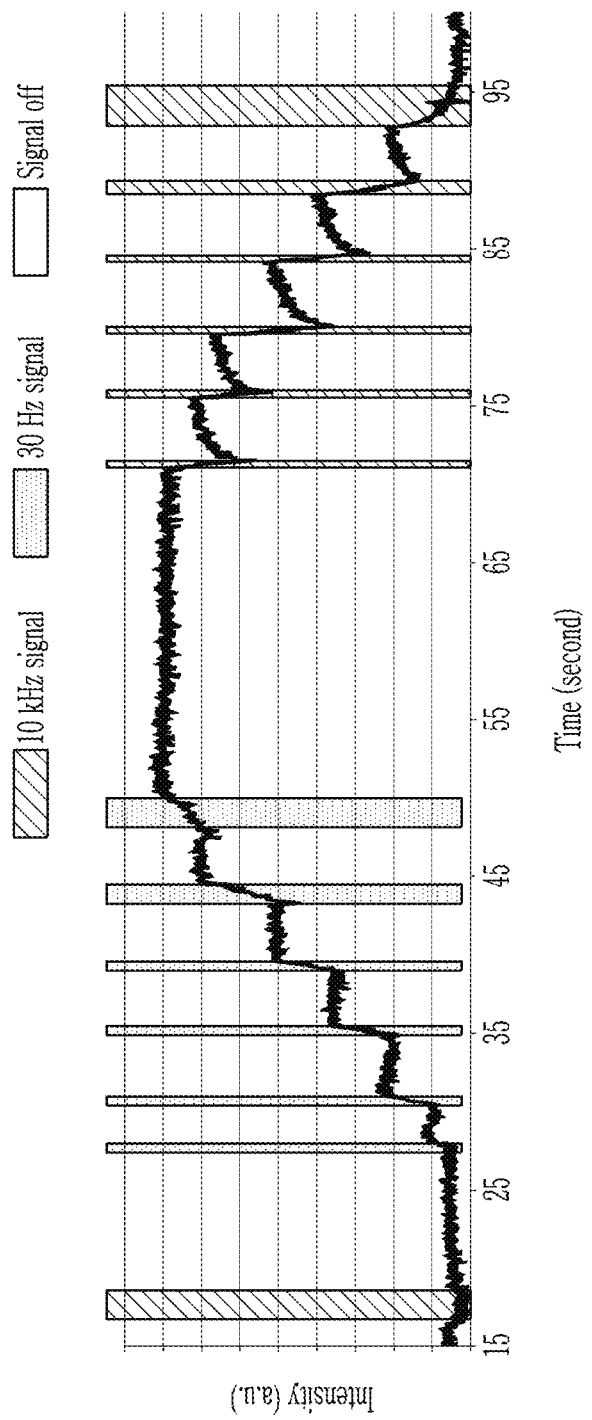
FIG. 21 illustrates a voltage applied intermittently and a change in light reflective intensity according to the intermittently applied voltage.

FIG. 21 is a graph illustrating a change in light reflective intensity when a voltage having a specific frequency is intermittently applied in the reflective optical element using the anomalous orientation phenomenon. According to FIG. 21, while a voltage of 30 Hz is applied, the light reflective intensity is increased, and while the voltage is not applied, the intensity thereof is maintained. This means that when the voltage of 30 Hz is applied, the α-ZrP particles are gradually shown in a uniform lamellar state in the vertical direction to the electric field, and thus, the light reflectance is increased and the orientation thereof is maintained even after the voltage is removed.

Further, according to FIG. 21, while a voltage of 10 kHz is applied, the light reflective intensity is decreased, and when the voltage is not applied, the intensity thereof is maintained. This means that when the voltage of 10 kHz is applied, the α-ZrP particles are gradually changed to an anti-nematic state, and thus, the light reflectance is decreased and the orientation thereof is maintained even after the voltage is removed.

By using such a phenomenon, it is possible to realize an optical element in which even if the driving signal is removed after the screen is displayed, the screen that has already been displayed is maintained without disappearing. An optical element in which the displayed screen is maintained without disappearing even though the driving signal is removed can be applied to a low power consumption display and can be particularly useful when a relatively simple display form is required.

While this invention has been described in connection with what is presently considered to be practical exemplary embodiments, it is to be understood that the invention is not limited to the disclosed embodiments, but, on the contrary, is intended to cover various modifications and equivalent orientations included within the spirit and scope of the appended claims.

The invention claimed is:

1. An optical element comprising:
a first polarizer and a second polarizer disposed to be perpendicular to each other; and
a cell disposed between the first polarizer and the second polarizer,
wherein the cell includes
a first substrate and a second substrate facing each other,
an electrode positioned between the first substrate and the second substrate, and
a dispersion disposed between the first substrate and the second substrate and including particles,
wherein the particles include at least one of peeled α-ZrP particles or peeled α-TiP particles,
wherein the particles are in a nematic state,
wherein the orientation of the particles is changed by an electric field applied to the electrode, and
wherein the particles have a concentration of 0.5 wt % to 5 wt % with respect to the entire content of the dispersion.

2. The optical element of claim 1, wherein:
the electrode includes a pixel electrode and a common electrode, and
the pixel electrode and the common electrode are positioned on the same substrate.

3. The optical element of claim 1, wherein:
the electrode includes a pixel electrode and a common electrode,
the pixel electrode is positioned on the first substrate, and
the common electrode is positioned on the second substrate.

4. The optical element of claim 1, wherein:
the particles have disk structures, and
a monomer or a polymer or oligomer having a molecular weight of 500 or less binds to the surface of the particles.

5. The optical element of claim 1, wherein:
the dispersion includes an organic solvent, and
the organic solvent includes at least one selected from a group comprising acetone, dimethylformamide (DMF), N-methylpyrrolidinone (NMP), methanol, ethanol, isopropyl alcohol, toluene, tetrahydrofuran (THF), and mixtures thereof.

6. The optical element of claim 1, further comprising:
a light source unit.

7. The optical element of claim 1, wherein:
when an electric field having a frequency of more than 1 kHz is applied to the dispersion by the electrode, the particles are oriented in a parallel direction to the electric field, and
when an electric field having a frequency of less than 10 Hz is applied to the dispersion by the electrode, the particles are oriented in an isotropic state.

8. The optical element of claim 1, wherein:
when an electric field having a frequency of 10 Hz to 1 kHz is applied to the dispersion by the electrode, the particles are maintained in a nematic state and oriented in a vertical direction to the electric field, and
when an electric field having a frequency of less than 10 Hz is applied to the dispersion by the electrode, the particles are oriented in an isotropic state.

9. The optical element of claim 1, wherein:
the direction of the electric field applied by the electrode forms an angle of 180° or 45° with a polarization direction of at least one of the first polarizer or the second polarizer to control the orientation direction of the particles.

10. The optical element of claim 1, wherein:
the particles have a concentration of 2 wt % to 5 wt % with respect to the entire content of the dispersion.

11. The optical element of claim 10, wherein:
the orientation of the particles is maintained after the electric field is removed.

12. An optical element comprising:
a first polarizer and a second polarizer disposed to be perpendicular to each other; and
a cell disposed between the first polarizer and the second polarizer,
wherein the cell includes
a first substrate and a second substrate facing each other,
an electrode positioned between the first substrate and the second substrate, and
a dispersion disposed between the first substrate and the second substrate,
wherein the dispersion includes particles,
wherein the particles include at least one of α-ZrP particles or α-TiP particles including a plurality of layers,
wherein the particles are in an isotropic state,
wherein the orientation of the particles is changed by an electric field applied to the electrode, and
the particle have a concentration of 0.5 wt % to 15 wt % with respect to the entire content of the dispersion.

13. The optical element of claim 12, wherein:
the plurality of layers are 10 to 50 layers.

14. An optical element comprising:
a first substrate and a second substrate facing each other;
an electrode positioned between the first substrate and the second substrate; and
a dispersion disposed between the first substrate and the second substrate and including particles,
wherein the particles include at least one of peeled α-ZrP particles and peeled α-TiP particles,
wherein the particles are in a lamellar state, wherein light is selectively reflected by the electric field applied to the electrode, and wherein the particles have a concentration of 0.3 wt % to 1.5 wt % with respect to the entire content of the dispersion.

15. The optical element of claim 14, wherein:

the electrode includes a pixel electrode and a common electrode, and the pixel electrode and the common electrode are positioned on the same substrate.

16. The optical element of claim 14, wherein:

the electrode includes a pixel electrode and a common electrode, the pixel electrode is positioned on the first substrate, and the common electrode is positioned on the second substrate.

17. The optical element of claim 14, wherein:

the particles have disk structures, and a polymer or oligomer having a molecular weight of 500 or more binds to the surface of the particles.

18. The optical element of claim 14, wherein:

as the concentration of the particles included in the dispersion is increased, the wavelength of reflected light is decreased.

19. The optical element of claim 14, wherein:

the dispersion includes an organic solvent, and the organic solvent includes at least one selected from a group comprising acetone, dimethylformamide (DMF), N-methylpyrrolidinone (NMP), methanol, ethanol, isopropyl alcohol, toluene, tetrahydrofuran (THF), and mixtures thereof.

20. The optical element of claim 14, wherein:

the orientation of the particles alternates between a lamellar state in a parallel direction to the electric field and an isotropic state or alternates between the lamellar state in the parallel direction to the electric field and an anti-nematic state by modulating the frequency of the electric field applied by the electrode, and a light reflectance is changed.

21. The optical element of claim 14, wherein:

the orientation of the particles alternates between a lamellar state in a vertical direction to the electric field and an isotropic state or alternates between the lamellar state in the vertical direction to the electric field and an anti-nematic state by modulating the frequency of the electric field applied by the electrode, and a light reflectance is changed.

22. The optical element of claim 14, wherein:

the orientation of the particles is maintained after the predetermined electric field is removed.

* * * * *